United States Patent
Wang

(10) Patent No.: US 12,047,840 B2
(45) Date of Patent: Jul. 23, 2024

(54) EVENT PROCESSING METHOD, DEVICE, AND SYSTEM

(71) Applicant: Tencent Technology (Shenzhen) Company Limited, Shenzhen (CN)

(72) Inventor: Tao Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 555 days.

(21) Appl. No.: 17/318,426

(22) Filed: May 12, 2021

(65) Prior Publication Data

US 2021/0266708 A1 Aug. 26, 2021

Related U.S. Application Data

(63) Continuation of application No. PCT/CN2020/079148, filed on Mar. 13, 2020.

(30) Foreign Application Priority Data

Mar. 29, 2019 (CN) .......................... 201910252297.3

(51) Int. Cl.
*H04W 4/029* (2018.01)
*H04B 17/318* (2015.01)
(Continued)

(52) U.S. Cl.
CPC .......... *H04W 4/029* (2018.02); *H04B 17/318* (2015.01); *H04W 4/023* (2013.01);
(Continued)

(58) Field of Classification Search
CPC ..... H04W 4/029; H04W 4/023; H04W 76/20; H04W 8/08; H04W 28/24; H04B 17/318
(Continued)

(56) References Cited

U.S. PATENT DOCUMENTS

2004/0106414 A1* 6/2004 Ewert .................... H04W 60/04
455/456.3
2007/0123268 A1* 5/2007 Parata ................... H04W 64/00
455/456.1
(Continued)

FOREIGN PATENT DOCUMENTS

CN 1791263 A 6/2006
CN 1327743 C 7/2007
(Continued)

OTHER PUBLICATIONS

TSG-RAN Working Group 2 (Radio layer 2 and Radio layer 3) TSGR2#4(99)421—R2-499421 Berlin, Germany, May 25 to 28, 1999 (Year: 1999).*

(Continued)

*Primary Examiner* — William Nealon
(74) *Attorney, Agent, or Firm* — Crowell & Moring LLP

(57) ABSTRACT

An event processing method, a device, and a system are disclosed in embodiments of this disclosure, to facilitate an application program adjusting a parameter configuration policy according to a radio signal strength of a UE. The event processing method according to an embodiment includes: generating a location report request, the location report request being used for requesting a deferred location report based on a radio signal strength of a user equipment (UE) and indicating a triggering event for triggering the deferred location report; transmitting the location report request to the UE, the location report request triggering the UE to determine whether the triggering event occurs according to the radio signal strength of the UE; and obtaining event reporting information transmitted by the UE to the location application device in response to the triggering event occurring.

20 Claims, 11 Drawing Sheets

(51) Int. Cl.
- *H04W 4/02* (2018.01)
- *H04W 8/08* (2009.01)
- *H04W 28/24* (2009.01)
- *H04W 76/20* (2018.01)

(52) U.S. Cl.
CPC ............. *H04W 8/08* (2013.01); *H04W 28/24* (2013.01); *H04W 76/20* (2018.02)

(58) Field of Classification Search
USPC ...................................................... 455/456.3
See application file for complete search history.

(56) References Cited

U.S. PATENT DOCUMENTS

| | | | |
|---|---|---|---|
| 2018/0054795 A1 | 2/2018 | Edge | |
| 2018/0054796 A1* | 2/2018 | Edge | .................... H04W 4/029 |
| 2018/0098279 A1 | 4/2018 | Edge | |

FOREIGN PATENT DOCUMENTS

| | | |
|---|---|---|
| CN | 101455096 A | 6/2009 |
| CN | 101925832 A | 12/2010 |
| CN | 104181569 A | 12/2014 |
| CN | 109951867 A | 6/2019 |
| EP | 1 768 424 A1 | 3/2007 |
| WO | WO 2006/111822 A3 | 12/2006 |

OTHER PUBLICATIONS

3GPP TS 23.273 V0.2.0 (Mar. 2019) (Year: 2019).*

Office Action for Korean Patent Application No. 10-2021-7014825 dated Sep. 30, 2022, 6 pages.

Office Action with English Translation of Notice of Reasons for Refusal for Japanese Patent Application No. 2021-539552 dated Jul. 19, 2022, 11 pages.

Qualcomm Incorporated, "Addition of Deferred 5GC-MT-LR Procedure for Periodic, Triggered and UE Available Location Events", *SA WG 2 Meeting* #131, section 2, Feb. 25-Mar. 1, 2019; Santa Cruz, Tenerife, Spain, 9 pages.

International Search Report and Written Opinion with English Translation for International Application No. PCT/CN2020/079148 dated Jun. 2, 2020; 11 pages.

Office Action with English Translation of Concise Explanation of Relevance for Chinese Patent Application No. 201910252297.3 dated Mar. 4, 2020; 9 pages.

3GPP TR 22.935 V8.0.0 (Dec. 2008), 3rd Generation Partnership Project; Technical Specification Group Services and System Aspects; Feasibility study on Location Services (LCS) for Wireless Local Area Network (WLAN) interworking (Release 8), 15 pages.

Qualcomm Incorporated, "Deferred 5GC-MT-LR Procedure for Periodic, Triggered and UE Available Location Events" *SA WG2 Meeting* #131, Section 2, Mar. 1, 2019; 12 pages.

Extended European Search Report for European Patent Application No. 20783743.6 dated Apr. 20, 2022, 10 pgs.

"3rd Generation Partnership Project; Technical Specification Group Services and System Aspects; 5G System Location Services (LCS) (Release 16)", 3GPP Draft; 23273-020-RM, 3rd Generation Partnership Project (3GPP), Mobile Competence Centre ; 650, Route Des Lucioles ; F-06921 Sophia-Antipolis Cedex ; France vol. SA GW2 Mar. 15, 2019 (Mar. 15, 2019), XP051697373, Retrieved from the Internet: URL:http://www.3gpp.org/ftp/tsg%5Fsa/WG2%5Farch/Latest%5FSA2%5FSpecs/Latest%5Fdraft%5FS2%5FSpecs/23273%2D020%2Ezip [retrieved Mar. 15, 2019].

* cited by examiner

EVENT PROCESSING METHOD, DEVICE, AND SYSTEM

RELATED APPLICATION

This application is a continuation application of the International PCT Application No. PCT/CN2020/079148, filed with the China National Intellectual Property Administration, PRC on Mar. 13, 2020 which claims priority to Chinese Patent Application No. 201910252297.3, filed with the China National Intellectual Property Administration, PRC on Mar. 29, 2019, each of which is incorporated herein by reference in their entireties.

FIELD OF THE TECHNOLOGY

This application relates to the field of computer technologies, and in particular, to an event processing method, a device, and a system.

BACKGROUND OF THE DISCLOSURE

In current wireless communication systems, there are five types of location requests as described below:

The first location request type may be a network induced location request (NI-LR). In the NI-LR, for some special regulatory services such as emergency call of a user equipment (UE), an access and mobility management function (AMF) entity serving the UE triggers a location report request.

The second location request type may be a mobile terminated location request (MT-LR). In the MT-LR, an external application function (AF) entity or a location services (LCS) client in a public land mobile network (PLMN) sends a location request to the PLMN to request location information of a target UE.

The third location request type may be a mobile originated location request (MO-LR). In the MO-LR, a UE sends a location request to a serving PLMN to obtain location information related to the UE.

The fourth location request type may be an immediate location request. In the immediate location request, an LCS client sends a location request to a target UE (or a group of target UEs) and expects to receive a response including location information of the target UE (or the group of target UEs) within a short period of time, and the time period may be associated with a special Quality of Service (QoS) requirement.

The fifth location request type may be a deferred location request. In the deferred location request, an LCS client sends a location request of a target UE (or a group of target UEs) to a PLMN and expects to receive a response including location information of the target UE (or the group of target UEs) in a future time period or when an event occurs.

When the location request type is a deferred location request, a trigger event triggering the deferred location request needs to be defined, but a trigger event defined currently cannot implement a requirement of an application program for adjusting a parameter configuration policy.

SUMMARY

Embodiments of this disclosure provide an event processing method, a device, and a system, which may implement a requirement of an application program for adjusting a parameter configuration policy according to a radio signal strength, thereby improving the flexibility of parameter configuration policy adjustment.

The embodiments of this disclosure provide the following solutions:

According to one aspect, an embodiment of this disclosure provides an event processing method, performed by a location application device, the method including:
  generating, by the location application device, a location report request, the location report request being used for indicating a radio signal strength-based triggering event;
  transmitting, by the location application device, the location report request to a user equipment (UE), so that the UE determines, according to a radio signal strength of the UE, whether the triggering event occurs; and
  obtaining, by the location application device, event reporting information transmitted by the UE according to occurrence of the triggering event.

According to another aspect, an embodiment of this disclosure further provides an event processing method, performed by a UE, the method including:
  obtaining, by the UE, a location report request generated by a location application device, the location report request being user for indicating a radio signal strength-based triggering event;
  obtaining, by the UE, a radio signal strength of the UE according to the location report request;
  determining, by the UE according to the radio signal strength of the UE, whether the triggering event occurs; and
  transmitting, by the UE, event reporting information to the location application device in response to occurrence of the triggering event.

In some embodiments of this disclosure, the obtaining, by the UE, a location report request generated by a location application device includes:
  when the location application device is specifically an application function (AF) entity, transmitting, by the AF entity, the location report request to a gateway mobile location center (GMLC); transmitting, by the GMLC, the location report request to an access and mobility management function (AMF) entity; and transmitting, by the AMF entity, the location report request to the UE; or
  when the location application device is specifically a location services (LCS) client, transmitting, by the LCS client, the location report request to a GMLC; transmitting, by the GMLC, the location report request to an AMF entity; and transmitting, by the AMF entity, the location report request to the UE.

According to another aspect, an embodiment of this disclosure further provides a location application device, including a processing module and a transceiving (transmitting-receiving) module, where
  the processing module is configured to generate a location report request, the location report request being used for indicating a radio signal strength-based triggering event;
  the processing module is further configured to transmit, by using the transceiving module, the location report request to a UE, so that the UE determines, according to a radio signal strength of the UE, whether the triggering event occurs; and
  the processing module is further configured to obtain event reporting information transmitted by the UE according to occurrence of the triggering event.

In the foregoing aspect, constituent modules of the location application device may further perform steps described in the foregoing one aspect and various possible implementations. For details, refer to the foregoing descriptions of the foregoing one aspect and various possible implementations.

In some embodiments of this disclosure, the location application device may be specifically an AF entity or an LCS client.

According to another aspect, an embodiment of this disclosure further provides a UE, including a processing module and a transceiving module, where the processing module is configured to obtain, by using the transceiving module, a location report request generated by a location application device, the location report request being used for indicating a radio signal strength-based triggering event;

the processing module is further configured to obtain a radio signal strength of the UE according to the location report request;

the processing module is further configured to determine, according to the radio signal strength of the UE, whether the triggering event occurs; and the processing module is further configured to transmit, by using the transceiving module, event reporting information to the location application device in response to occurrence of the triggering event.

In the foregoing aspect, constituent modules of the UE may further perform steps described in the foregoing another aspect and various possible implementations. For details, refer to the foregoing descriptions of the foregoing another aspect and various possible implementations.

According to another aspect, an embodiment of this disclosure provides a location application device, including a processor and a memory, the memory being configured to store instructions, the processor being configured to execute the instructions in the memory, to cause the location application device to perform the method according to any one of the foregoing aspects.

According to another aspect, an embodiment of this disclosure provides a UE, including a processor and a memory, the memory being configured to store instructions, the processor being configured to execute the instructions in the memory, to cause the UE to perform the method according to any one of the foregoing aspects.

According to another aspect, an embodiment of this disclosure provides an event processing system, including a location application device and a UE, where the location application device is configured to perform the event processing method according to the foregoing one aspect, and the UE is configured to perform the event processing method according to the foregoing another aspect.

According to another aspect, an embodiment of this disclosure provides a non-transitory storage medium, storing instructions, the storage medium, when run on a computer, causing the computer to perform the method according to the foregoing aspects.

In the embodiments of this disclosure, a location application device first generates a location report request, then the location application device sends the location report request to a UE. The UE may obtain the location report request generated by the location application device, obtain a radio signal strength of the UE according to the location report request, then determine, according to the radio signal strength of the UE, whether a triggering event occurs, and send event reporting information to the location application device in response to occurrence of the triggering event. The location application device obtains the event reporting information sent by the UE according to the occurrence of the triggering event. In the embodiments of this disclosure, the location application device may indicate the radio signal strength-based triggering event to the UE, so that the UE may determine whether, according to the radio signal strength of the UE, the triggering event occurs. The location application device may determine a condition of the radio signal strength of the UE according to the event reporting information sent by the UE, to implement a requirement of an application program for adjusting a parameter configuration policy according to a radio signal strength.

BRIEF DESCRIPTION OF THE DRAWINGS

To describe the technical solutions in embodiments of this disclosure more clearly, the following briefly introduces the accompanying drawings required for describing the embodiments. Apparently, the accompanying drawings in the following description show merely some embodiments of this disclosure, and a person skilled in the art may still derive other accompanying drawings from these accompanying drawings.

DESCRIPTION OF EMBODIMENTS

To make the objectives, features, and advantages of this application clearer and more comprehensible, the following clearly and completely describes the technical solutions in the embodiments of this disclosure with reference to the accompanying drawings in the embodiments of this disclosure. Apparently, the embodiments described below are merely some rather than all of the embodiments of this disclosure. All other embodiments obtained by a person skilled in the art based on the embodiments of this disclosure fall within the protection scope of this application.

The terms "include", "contain" and any other variants thereof in the specification, claims, and accompanying drawings of this application are intended to cover a non-exclusive inclusion, so that a process, method, system, product, or device that includes a series of units is not necessarily limited to those units, but may include other units not expressly listed or inherent to such a process, method, product, or device.

Figure 1:
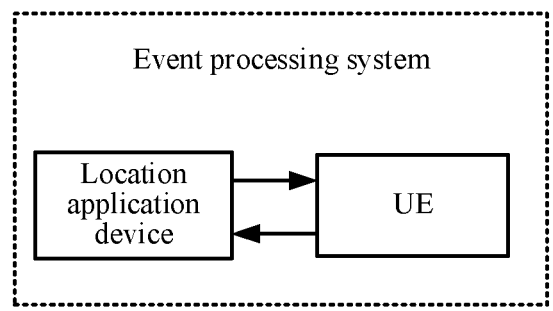
FIG. 1 is a schematic structural diagram of composition of an exemplary event processing system according to an embodiment of this disclosure.

An event processing method provided in the embodiments of this disclosure may be applied to an event processing system, and the event processing system is a part of a wireless communication system. As shown in FIG. 1, the event processing system may include: a location application device and a user equipment (UE). The location application device includes a device, a server, or another entity that needs to use a UE location, and the location application device may trigger the UE to report its location. For example, the location application device may be an application function (AF) entity or a location services (LCS) client. The UE may be a terminal or a device entity which is capable of providing its location, and the UE may report its location according to a location report request sent by the location application device. In the embodiments of this disclosure, the location application device may communicate with the UE. For example, the location application device may directly communicate with the UE, or the location application device may indirectly communicate with the UE. For example, the location application device may communicate with the UE by using a network device in the wireless communication system.

The wireless communication system provided in the embodiments of this disclosure may include a 3G, a 4G, or a 5G system. The 5G system may be divided into two parts: an access network and a core network. The access network is configured to implement functions related to wireless access, and includes a radio access network (RAN). The core network mainly includes the following several key control plane logic network elements: a network exposure function (NEF) entity, a gateway mobile location center (GMLC), an LCS client, an access and mobility management function (AMF) entity, a location management function (LMF) entity, and the like.

In a possible implementation, the core network may further include: a unified data management (UDM) entity, a location retrieval function (LRF) entity, and the like. In addition, the embodiments of this disclosure may further include an application function (AF) entity, where the AF entity may be a logic element belonging to the control plane of the core network or may be an application function entity outside the core network. It may be understood that, the foregoing entities may be hardware device entities or software apparatuses implementing the functions, which is not limited herein.

The AF entity is configured to provide information of an application layer, for example, send a location report request. The NEF is configured to authenticate the AF entity and map and forward parameters. The LCS client is a device that may use the UE location in location services. The GMLC is a gateway having a location management function. The AMF entity has an access and mobility management function. The LMF entity is configured to interact with the UE to obtain location information of the UE. For example, the LMF entity may be equipped with a locating algorithm for obtaining the UE location. In subsequent embodiments, the AF entity may be referred to as AF for short. Similarly, the AMF entity is referred to as AMF for short, and the NEF entity is referred to as NEF for short. In addition, in the embodiments of this disclosure, a radio signal strength-based triggering event refers to a triggering event triggered by or based on a radio signal strength, and the radio signal strength may be also referred to as a signal coverage strength, a radio signal magnitude, or the like.

Figure 2:
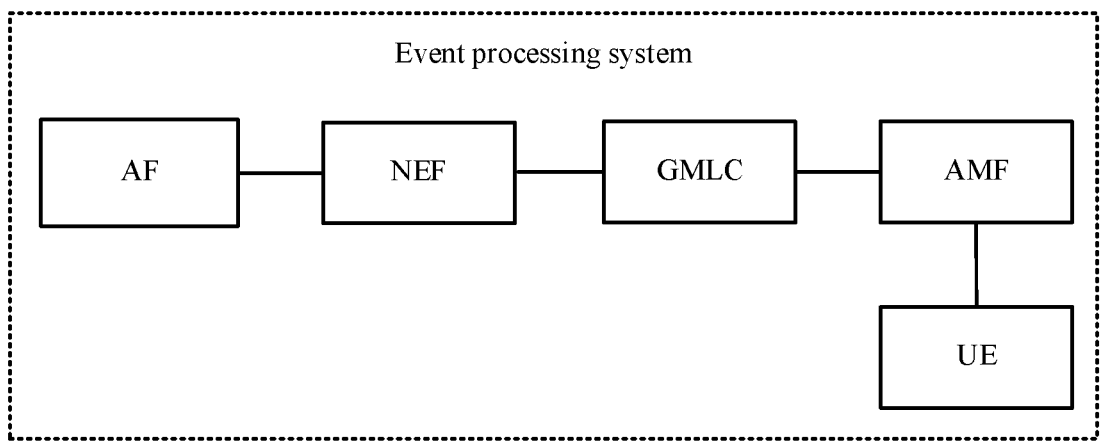
FIG. 2 is a schematic structural diagram of composition of another exemplary event processing system according to an embodiment of this disclosure.

In some embodiments of this disclosure, the location application device may be an AF entity. FIG. 2 is a schematic structural diagram of composition of an event processing system according to an embodiment of this disclosure. The event processing system includes: an AF, an NEF, a GMLC, an AMF, and a UE, where a communication connection is established between the AF and the NEF, a communication connection is established between the NEF and the GMLC, a communication connection is established between the GMLC and the AMF, and a communication connection is established between the AMF and the UE. Description is made below by using an example. In FIG. 2, the AF may directly communicate with the NEF. For example, the AF communicates with the NEF by using an N33 interface or a service-based interface. The NEF communicates with the GMLC by using a non-linear editing (NLe) interface or a service-based interface, and the GMLC communicates with the AMF by using a natural language generation (NLg) interface or a service-based interface. In a possible implementation, in FIG. 2, the AMF is directly connected to the UE, but the AMF may communicate with the UE by using a radio access network (RAN).

Figure 3:
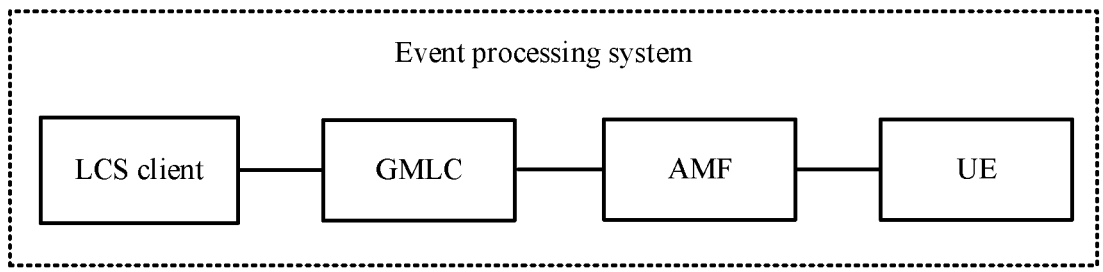
FIG. 3 is a schematic structural diagram of composition of another exemplary event processing system according to an embodiment of this disclosure.

In some embodiments of this disclosure, the location application device may be an LCS client. FIG. 3 is a schematic structural diagram of composition of an example event processing system according to an embodiment of this disclosure. The event processing system includes: an LCS client, a GMLC, an AMF, and a UE, where a communication connection is established between the LCS client and the GMLC, a communication connection is established between the GMLC and the AMF, and a communication connection is established between the AMF and the UE. Description is made below by using an example. In FIG. 3, the LCS client communicates with the GMLC by using an Le interface or a service-based interface, and the GMLC communicates with the AMF by using an NLg interface or a service-based interface. In a possible implementation, in FIG. 3, the AMF is directly connected to the UE, but the AMF may communicate with the UE by using a RAN.

Figure 4:
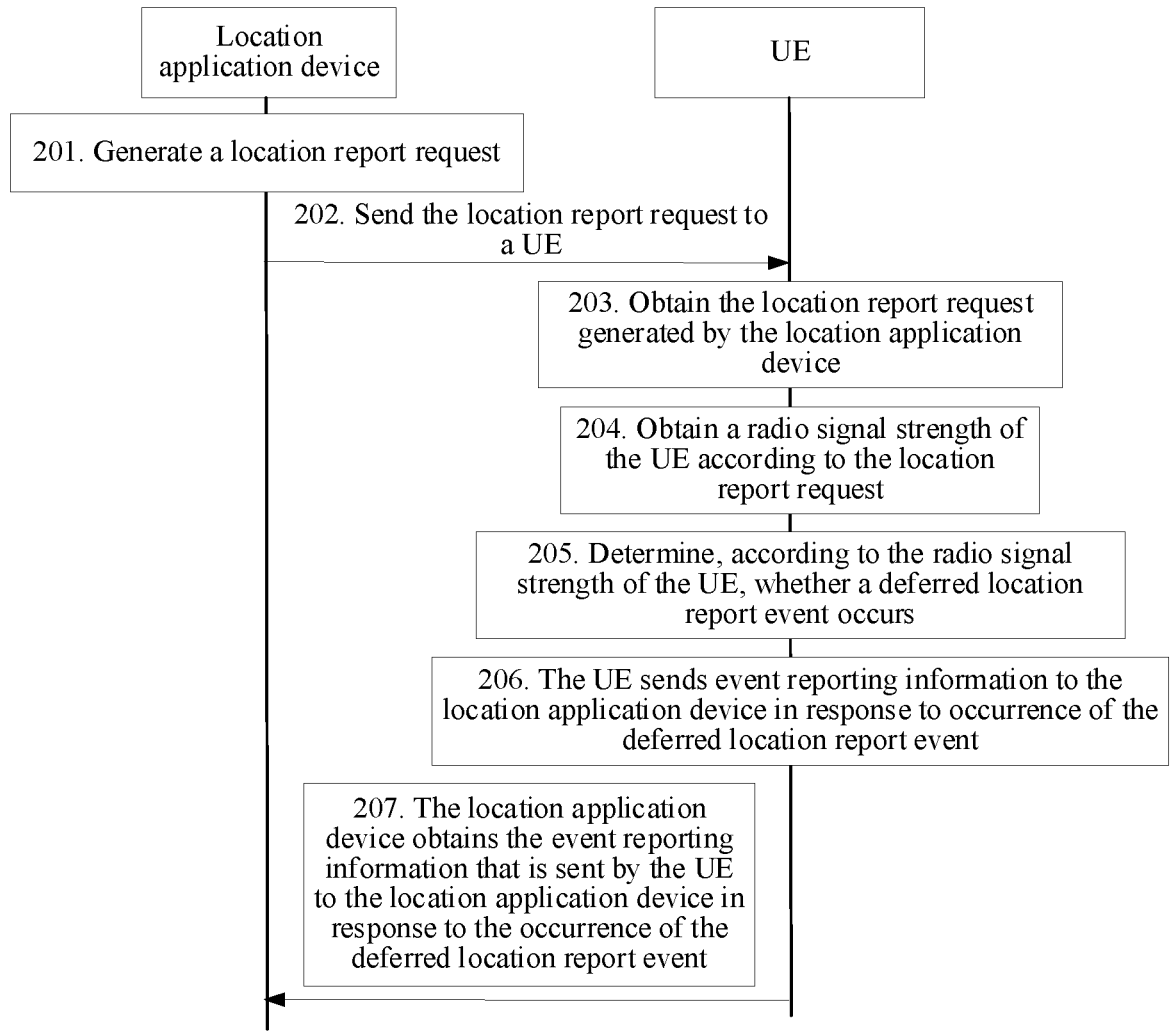
FIG. 4 is a schematic flowchart of interaction between a location application device and a UE according to an embodiment of this disclosure.

An interaction process between the location application device and the UE in the event processing system in an embodiment of this disclosure is described below by using an example. FIG. 4 shows an event processing method according to an embodiment of this disclosure, and the method may include the following steps:

201. A location application device generates a location report request.

The location report request is used for requesting a deferred location report based on a radio signal strength of a user equipment (UE) and indicating a triggering event for triggering the deferred location report, the triggering event may be based on the radio signal strength of the UE.

In this embodiment of this disclosure, the location application device may need to obtain a UE location when a specific triggering event occurs or need to obtain a notification of occurrence of the triggering event. The location application device may define a triggering event for triggering event, to inform the UE to detect whether the triggering event occurs. The UE may report the triggering event to the location application device in response to occurrence of the triggering event. In a possible implementation, if the location application device instructs the UE to report the UE location, event reporting information sent by the UE in response to occurrence of the triggering event may further include location information of the UE. For example, the location application device may be an AF entity or an LCS client. A form of the location application device may be determined according to an application scenario.

In this embodiment of this disclosure, the location application device defines a triggering event based on or triggered by the radio signal strength. That is, the location application device needs to instruct the UE to acquire radio signal strength information of the UE, to determine, according to the radio signal strength information, whether the triggering event occurs.

In this embodiment of this disclosure, after the location application device defines the radio signal strength-based triggering event, the location application device may generate a location report request and add the radio signal strength-based triggering event to the location report request. A request type of the location report request in this embodiment of this disclosure may be determined according to an application scenario. For example, the request type of the location report request may be a deferred location report request.

Figure 5:
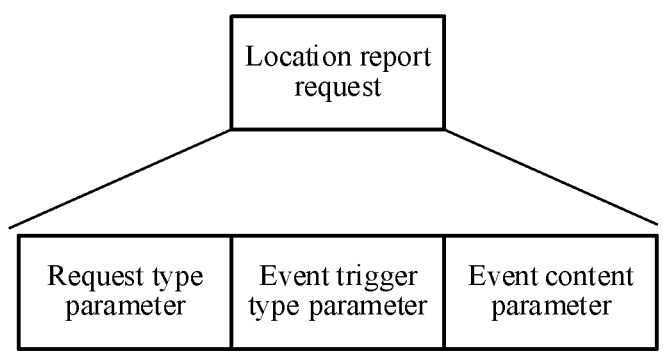
FIG. 5 is a schematic diagram of components of a location report request according to an embodiment of this disclosure.

In some embodiments of this disclosure, FIG. 5 shows a schematic diagram of components of a location report request according to an embodiment of this disclosure. The location report request generated by the location application device includes at least one of the following parameters: a request type parameter, an event trigger type parameter, and an event content parameter, where
  the request type parameter is used for indicating that a request type of the location report request is a type of deferred location report;
  the event trigger type parameter is used for indicating that a trigger type of the triggering event is a radio signal strength trigger type; and
  the event content parameter is used for indicating content information corresponding to the triggering event.

In a possible implementation, when the location application device generates the location report request, the location application device needs to obtain at least one of the request type parameter, the event trigger type parameter, and the event content parameter, and a quantity of parameters carried by the location report request may be determined according to a requirement of an application scenario. The deferred location report type may be indicated by the request type parameter, so that the UE may determine that the request type is the deferred location report type when parsing the request type parameter. The radio signal strength trigger type may be indicated by the event trigger type parameter, so that the UE may determine that the trigger type is the radio signal strength trigger type when parsing the event trigger type parameter, and the UE needs to acquire the radio signal strength of the UE. The event content corresponding to the radio signal strength-based triggering event may be indicated by the event content parameter, so that the UE may obtain the event content corresponding to the radio signal strength-based triggering event when parsing the event content parameter, and parameters included in the event content parameter may be flexibly configured by the location application device. In a possible implementation, the location report request may further include an identifier of the UE or a group identifier of the UE.

Figure 6:
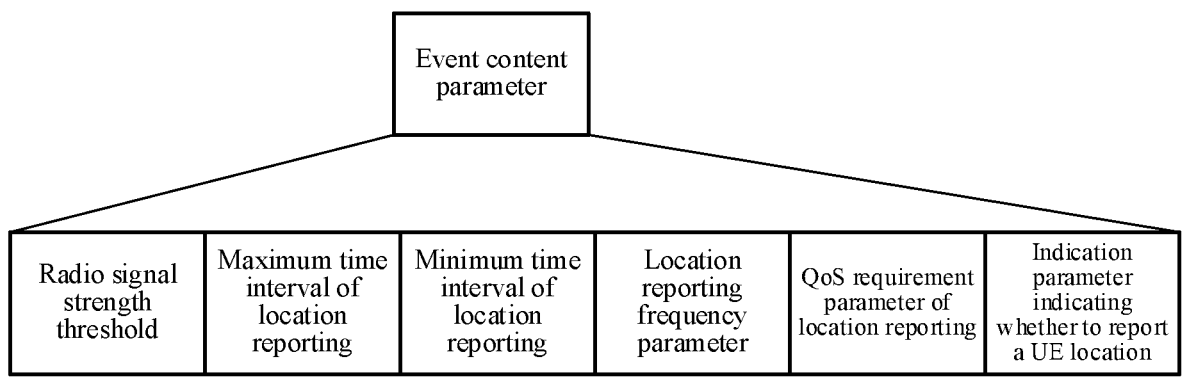
FIG. 6 is a schematic diagram of components of an event content parameter according to an embodiment of this disclosure.

In some embodiments of this disclosure, FIG. 6 shows a schematic diagram of components of an event content parameter according to an embodiment of this disclosure. The event content parameter includes at least one of the following parameters: a radio signal strength condition, a maximum time interval of location reporting, a minimum time interval of location reporting, a location reporting frequency parameter, a Quality of Service (QoS) requirement parameter of location reporting, and an indication parameter indicating whether to report a UE location. In some embodiments, the event content parameter may further include a periodicity of locating reporting, and the periodicity may be associated with the radio signal strength of the UE.

The event content parameter generated by the location application device may include a radio signal strength condition, where the radio signal strength condition refers to a condition that the radio signal strength needs to meet. Content of the radio signal strength condition may be configured according to an application scenario, for example, the radio signal strength condition may be that the radio signal strength of the UE is less than a radio signal strength threshold. The radio signal strength threshold refers to a minimum threshold of the radio signal strength of the UE. The radio signal strength threshold is used for instructing the UE to determine whether the condition for triggering event is met, and the radio signal strength threshold may be determined according to an application scenario, for example, determined according to a signal strength of an application program required by the location application device. In a possible implementation, the radio signal strength condition may be that the radio signal strength of the UE fall within a preset radio signal strength range.

The event content parameter generated by the location application device may include a maximum time interval of location reporting and a minimum time interval of location reporting. The maximum time interval of location reporting refers to a maximum time interval between two event reporting of the UE, and in response to that a time interval from the last event reporting reaches the maximum time interval, the UE triggers a location reporting process to indicate that an interval between the last event reporting and a current time has reached the maximum time interval. The minimum time interval of location reporting defines a minimum time interval between two event reporting. By defining a minimum time interval for location reporting, the frequency of UE location reporting is limited and thus improving UE power efficiency. The minimum and maximum time interval for location reporting may be dynamically adjusted based on radio signal strength or coverage condition of the UE.

The event content parameter generated by the location application device may include a location reporting frequency parameter. The location reporting frequency parameter is a frequency at which the UE performs location reporting. For example, the location reporting frequency parameter may instruct the UE to perform location reporting for one time, or may instruct the UE to perform location reporting for at least two times according to a trigger event defined in the request. The UE is instructed to perform location reporting for at least two times in response to the location reporting frequency parameter, and the event content parameter may also carry maximum reporting times indicated by the location reporting frequency parameter. The UE stops event reporting in response to that reporting times of the UE exceeds the maximum reporting times.

The event content parameter generated by the location application device may include a location reporting QoS requirement parameter, and precision of the UE location required by the location application device may be indicated to the UE through the location reporting QoS requirement parameter. Accordingly, the UE may determine, according to the location reporting QoS requirement parameter, the precision of the location that needs to be reported.

The event content parameter generated by the location application device may include an indication parameter indicating whether to report a UE location. The indication parameter indicating whether to report a UE location may be directly sent to the UE, and the UE may determine whether to report the location of the UE to the location application device according to the indication parameter indicating whether to report a UE location. Alternatively, the indication parameter indicating whether to report a UE location may be indicated to an entity interacting with the location application device. The entity determines whether to request the location of the UE from the UE according to the indication parameter. For example, the entity may be an NEF or a GMLC, and if the location application device indicates that the NEF need to obtain the location of the UE, the NEF may instruct the UE to report the location of the UE.

In some other embodiments of this disclosure, the location application device may further configure other parameters to be included in the event content parameter according to an application scenario, the description of the event content parameter is an example and is not used as a limitation on the embodiments of this disclosure. In a possible implementation, the parameters configured by the location application device in the event content parameter may be indicated to the UE, so that the UE may obtain the parameters configured in the event content parameter.

202. The location application device sends the location report request to a UE.

Accordingly, the UE may receive the location report request. The location application device sends the location report request to the UE, and the UE may determine, according to a radio signal strength of the UE, whether the triggering event occurs.

In this embodiment of this disclosure, the location application device may communicate with the UE. For example, the location application device may directly communicate with the UE, and the location application device may send the location report request to the UE. Alternatively, the location application device may indirectly communicate with the UE. For example, the location application device may communicate with the UE by using a network device in a wireless communication system, the location application device may send the location report request to the network device, and the network device then sends or redirect the location report request to the UE.

In some embodiments of this disclosure, the location application device may indirectly communicate with the UE. In a possible implementation, in step 202, the sending, by the location application device, the location report request to a UE includes:

as shown in FIG. 2, when the location application device is an AF entity, sending, by the AF entity, the location report request to an NEF entity; sending, by the NEF entity, the location report request to a GMLC; sending, by the GMLC, the location report request to an AMF entity; and sending, by the AMF entity, the location report request to the UE; or as shown in FIG. 3, when the location application device is an LCS client, sending, by the LCS client, the location report request to a GMLC; sending, by the GMLC, the location report request to an AMF entity; and sending, by the AMF entity, the location report request to the UE.

In FIG. 2 and FIG. 3, in a possible implementation, the AMF entity sends the location report request to the UE through a RAN.

The location application device may indirectly communicate with the UE. For example, the location application device is an AF entity; the AF entity generates a location report request, and then sends the generated location report request to the UE through the NED entity, the GMLC, the AMF entity, and the RAN. In another example, the location application device is an LCS client; the LCS client generates a location report request, and then sends the generated location report request to the UE through the GMLC, the AMF entity, and the RAN. A transmission manner of the location report request may be determined according to an application scenario.

An information transmission process from the location application device to the UE is described in the foregoing embodiment. Similarly, an information transmission process from the UE to the location application device may also use the foregoing transmission path. For example, the UE generates event reporting information and transmits the event reporting information to the AF entity through the RAN, the AMF entity, the GMLC, and the NEF entity. In another example, the UE generates event reporting information and transmits the event reporting information to the LCS client through the RAN, the AMF entity, and the GMLC.

203. The UE obtains the location report request generated by the location application device.

The location report request is used for indicating a radio signal strength-based triggering event.

In this embodiment of this disclosure, the location report request generated by the location application device may be obtained by the UE, and the location application device may instruct, by using the location report request, the UE to detect the radio signal strength-based triggering event.

204. The UE obtains a radio signal strength of the UE according to the location report request.

In this embodiment of this disclosure, by parsing the location report request, the UE may learn that the UE needs to detect the radio signal strength-based triggering event. The UE may acquire the radio signal strength of the UE, and an acquisition manner of the radio signal strength of the UE is not limited in this application.

205. The UE determines, according to the radio signal strength of the UE, whether the triggering event occurs.

In this embodiment of this disclosure, after obtaining the radio signal strength of the UE, the UE may detect, according to the acquired radio signal strength, whether the radio signal strength-based triggering event occurs.

In some embodiments of this disclosure, the determining, by the UE according to the radio signal strength of the UE, whether the triggering event occurs includes:

detecting, by the UE, whether the radio signal strength of the UE meets the radio signal strength condition; determining, by the UE, that the triggering event occurs when the radio signal strength of the UE meets the radio signal strength condition; and determining, by the UE, that the triggering event does not occur when the radio signal strength of the UE does not meet the radio signal strength condition.

For example, the event content parameter generated by the location application device may include a radio signal strength threshold, the radio signal strength threshold is a minimum threshold of the radio signal strength of the UE, and the radio signal strength threshold is used for instructing the UE to determine whether the radio signal strength-based triggering event occurs. For example, the radio signal strength-based triggering event requires a radio signal strength to be lower than a threshold of −70 dBm, and if the radio signal strength currently acquired by the UE is −60 dBm, it is determined that the radio signal strength-based triggering event does not occur. If the radio signal strength currently acquired by the UE is −90 dBm, it is determined that the radio signal strength-based triggering event occurs. For example, the event content parameter generated by the location application device may be a radio signal strength range. The radio signal strength range is used for instructing the UE to determine whether the radio signal strength-based triggering event occurs, and if the UE detects that the radio signal strength of the UE falls within the range, it is determined that the event occurs.

206. The UE sends event reporting information to the location application device in response to occurrence of the triggering event.

In this embodiment of this disclosure, the UE sends event reporting information to the location application device in response to occurrence of the triggering event, and the location application device may obtain a condition of the radio signal strength of the UE according to the event reporting information.

An information transmission process from the location application device to the UE is described in the foregoing embodiment. Similarly, an information transmission process from the UE to the location application device may also use the foregoing transmission path. For example, the UE generates event reporting information and transmits the event reporting information to the AF entity through the RAN, the AMF entity, an LMF entity, the GMLC, and the NEF entity. In another example, the UE generates event reporting information and transmits the event reporting information to the LC S client through the RAN, the AMF entity, the LMF entity, and the GMLC.

In some embodiments of this disclosure, the sending, by the UE, event reporting information to the location application device in response to occurrence of the triggering event includes:

sending, by the UE, the event reporting information to the location application device in response to that the triggering event occurs and an interval between last event reporting and a current time has reached the minimum time interval; or sending, by the UE, deferred event reporting information to the location application device after a period of time after detecting occurrence of the triggering event, in response to that the triggering event occurs and an interval between last event reporting and a current time is less than the minimum time interval, the deferred event reporting information including an actual occurrence time of the triggering event; or sending, by the UE, deferred event reporting information to the location application device after a period of time after detecting occurrence of the triggering event, in response to that the triggering event occurs and the UE is unable to access a network currently when the triggering event occurs.

The event content parameter generated by the location application device may include a maximum time interval of location reporting and a minimum time interval of location reporting. The UE may send the event reporting information right away in response to that the radio signal strength-based triggering event occurs and an interval between the last event reporting and a current time has reached the minimum time interval. On the other hand, the UE may delay sending the event reporting information after the radio signal strength-based triggering event occurs. For example, if the interval between the last event reporting and the current time has not reached the minimum time interval; or if the UE is unable to access a network when the triggering event occurs.

207. The location application device obtains the event reporting information which is sent by the UE to the location application device in response to the occurrence of the triggering event.

In this embodiment of this disclosure, the UE may send the event reporting information according to the triggering event, and the event reporting information may be obtained by the location application device. In a possible implementation, the location application device may obtain an indication that the radio signal strength of the UE is lower than the radio signal strength threshold according to the event reporting information sent by the UE.

In some embodiments of this disclosure, the event reporting information is sent by the UE when detecting occurrence of the triggering event; or the event reporting information is sent by the UE after a period of time after detecting occurrence of the triggering event, and the event reporting information includes: an actual occurrence time at which the radio signal strength of the UE meets the radio signal strength condition.

As can be learned from the description of the foregoing embodiments of this disclosure, the location application device first generates the location report request, and then sends the location report request to the UE, where the location report request includes the triggering event type and a related content parameter. The UE may obtain the location report request generated by the location application device. The UE obtains the radio signal strength of the UE according to the location report request, and then determines, according to the radio signal strength of the UE, whether the triggering event occurs. When the triggering event occurs, the UE sends the event reporting information to the location application device, and the location application device obtains the event reporting information that is sent by the UE in response to the occurrence of the triggering event. In the embodiments of this disclosure, the location application device may indicate the radio signal strength-based triggering event to the UE, so that the UE may determine, according to the radio signal strength of the UE, whether the triggering event occurs. The location application device may determine a condition of the radio signal strength of the UE according to the event reporting information sent by the UE, and adjust a parameter configuration policy according to a radio signal strength, to meet a requirement of an application program associated with the UE.

Figure 7:
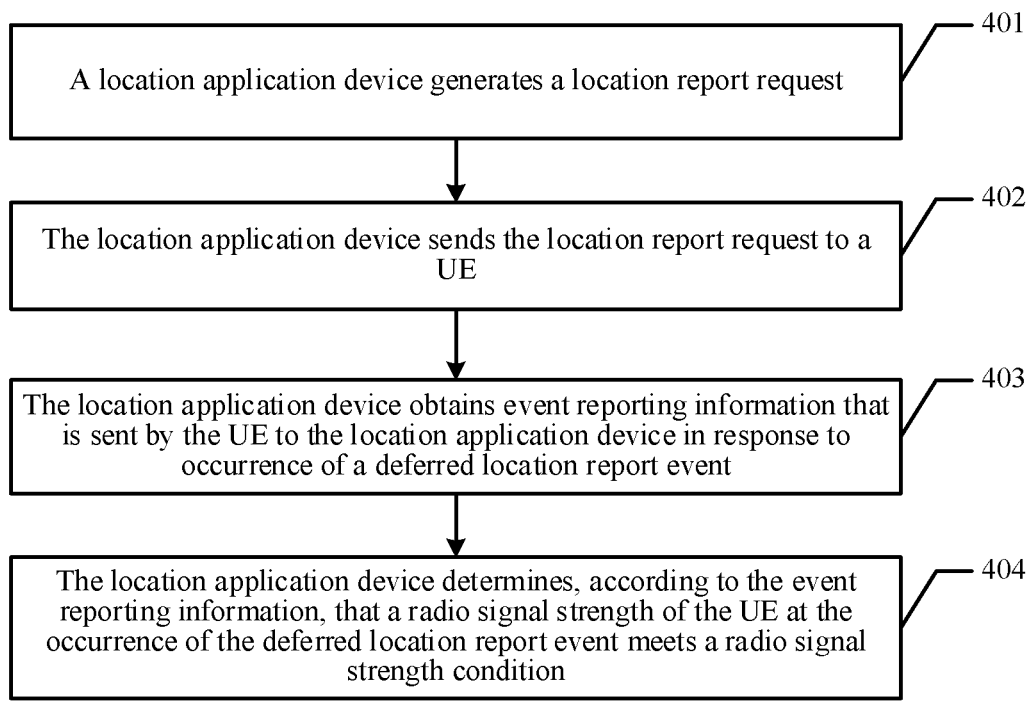
FIG. 7 is a schematic block flowchart of an exemplary event processing method performed by a location application device according to an embodiment of this disclosure.

An event processing method provided in an embodiment of this disclosure is described below from the perspective of a location application device. FIG. 7 shows an event processing method according to an embodiment of this disclosure, and the method mainly includes the following steps:

401. A location application device generates a location report request, the location report request being used for indicating a radio signal strength-based triggering event.

402. The location application device sends the location report request to a UE, so that the UE determines, according to a radio signal strength of the UE, whether the triggering event occurs.

Steps 401 and 402 are similar to steps 201 and 202 in the embodiment shown in FIG. 4. Details are not described herein again.

403. The location application device obtains event reporting information that is sent by the UE to the location application device in response to occurrence of the triggering event.

In this embodiment of this disclosure, the UE may send event reporting information according to the triggering event. The event reporting information may be obtained by the location application device, and the location application device may obtain, according to the event reporting information sent by the UE, an indication that the radio signal strength of the UE meets a radio signal strength condition.

404. The location application device determines, according to the event reporting information, that the radio signal strength of the UE at the occurrence of the triggering event meets a radio signal strength condition.

In some embodiments of this disclosure, the event content parameter generated by the location application device may include a radio signal strength condition, where the radio signal strength condition refers to a condition that the radio signal strength of the UE needs to meet, and content of the condition may be configured according to an application scenario. For example, the radio signal strength condition may be that the radio signal strength of the UE is less than a radio signal strength threshold, or the radio signal strength condition may be that the radio signal strength of the UE falls within a radio signal strength range.

Description is made below by using an example. In this embodiment of this disclosure, the location application device may indicate to some application programs that the radio signal strength of the UE is lower than the threshold, so that the application programs may generate a parameter adjustment policy for the UE. Some application programs may adjust the policy according to the radio signal strength. For example, some video application programs may adjust a value of a buffer associated with a video service (e.g., video streaming) in response to that the radio signal strength of the UE is less than a threshold, to increase data amount of the buffer, thereby improving watching quality of a video. The value of the buffer may be further determined based on the radio signal strength and a predetermine factor. In some embodiments, the predetermined factor may be negative correlated with the radio signal strength.

Figure 8:
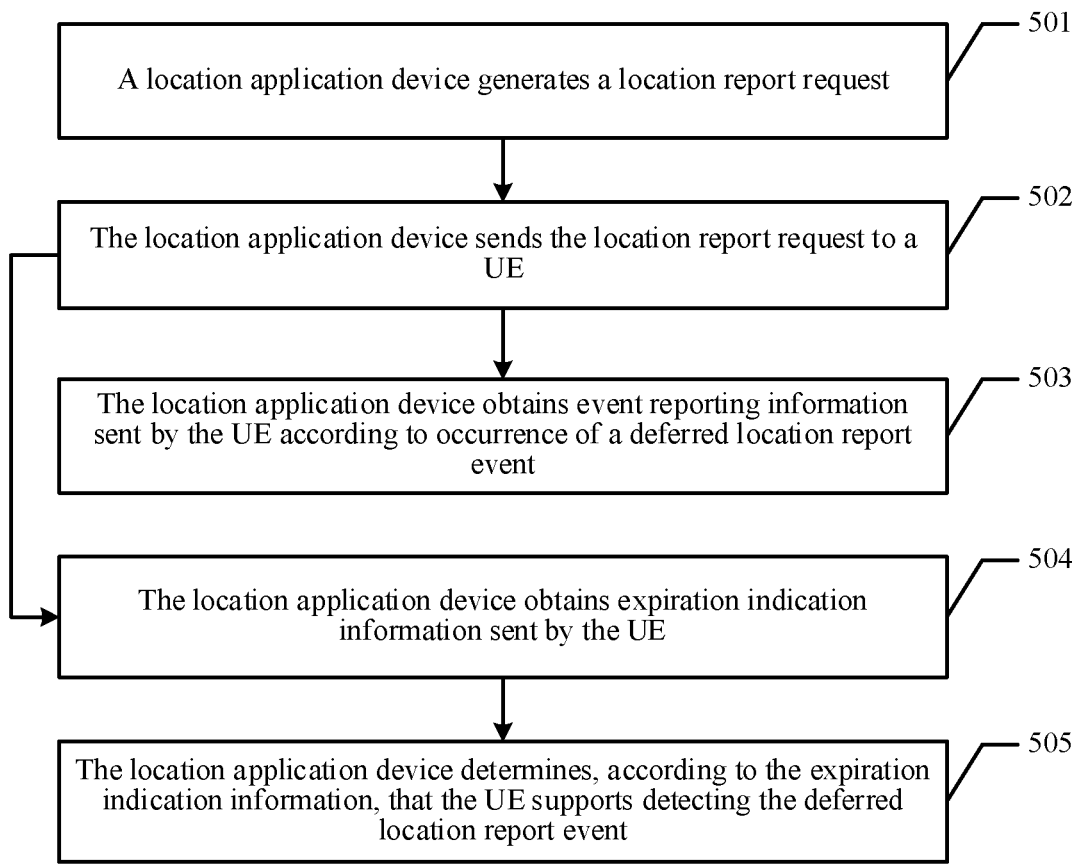
FIG. 8 is a schematic block flowchart of another exemplary event processing method performed by a location application device according to an embodiment of this disclosure.

Another event processing method provided in an embodiment of this disclosure is described below from the perspective of a location application device. FIG. 8 shows an event processing method according to an embodiment of this disclosure, and the method mainly includes the following steps:

501. A location application device generates a location report request, the location report request being used for indicating a radio signal strength-based triggering event.

502. The location application device sends the location report request to a UE, so that the UE determines, according to a radio signal strength of the UE, whether the triggering event occurs.

503. The location application device obtains event reporting information that is sent by the UE in response to occurrence of the triggering event.

Steps 501 to 503 are similar to steps 401 to 403 in the embodiment shown in FIG. 7. Details are not described herein again.

504. The location application device obtains expiration indication information sent by the UE.

The expiration indication information is used for indicating that the UE does not detect the triggering event after last event reporting and an interval between the last event reporting and a current time has reached a maximum time interval.

In this embodiment of this disclosure, the UE obtains a maximum time interval of location reporting from the location report request. The UE sends the expiration indication information to the location application device when the UE does not detect the triggering event since the last event reporting and the interval between the last event reporting and the current time has reached the maximum time interval. The location application device may obtain the expiration indication information. For example, the UE send the expiration indication information to the location application device in an indirect communication manner.

505. The location application device determines, according to the expiration indication information, that the UE supports detecting the triggering event.

In this embodiment of this disclosure, the UE sends the expiration indication information to indicate that the maximum time interval expires, in response to that the UE does not detect the triggering event since the last event reporting and the interval between the last event reporting and the current time has reached the maximum time interval. For example, the UE may trigger a location reporting process to indicate that the maximum time interval expires. The maximum time interval enables the location application device to keep perceiving whether the UE continues to support a specific radio signal strength event, for example, to detect whether a radio signal reporting event is canceled due to shutdown of the UE.

Figure 9:
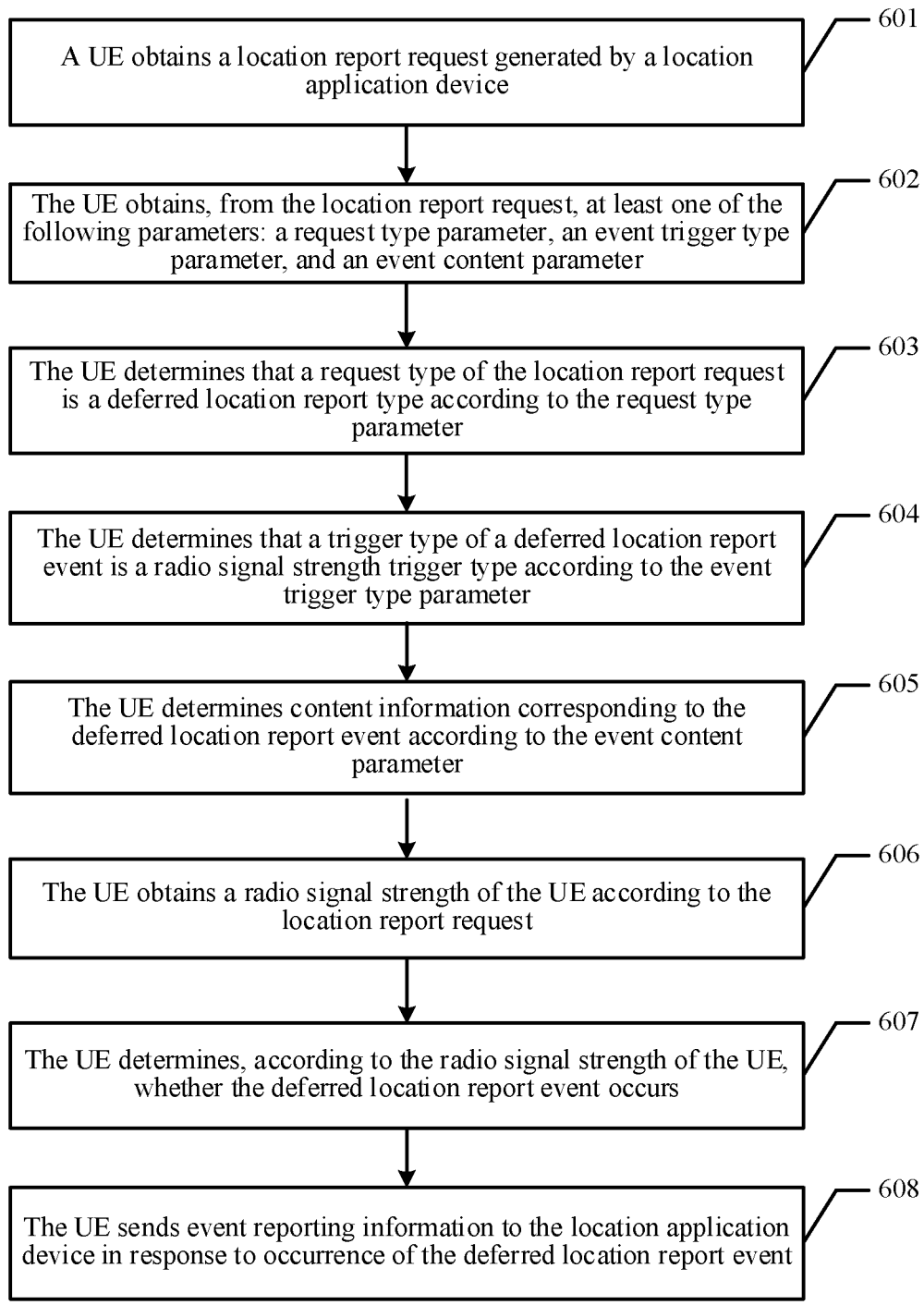
FIG. 9 is a schematic block flowchart of an exemplary event processing method performed by a UE according to an embodiment of this disclosure.

An event processing method provided in an embodiment of this disclosure is described below from the perspective of a UE. FIG. 9 shows an event processing method according to an embodiment of this disclosure, and the method mainly includes the following steps:

601. A UE obtains a location report request generated by a location application device, the location report request being used for indicating a radio signal strength-based triggering event.

Step 601 is similar to step 203 in the embodiment shown in FIG. 4. Details are not described herein again.

602. The UE obtains, from the location report request, at least one of the following parameters: a request type parameter, an event trigger type parameter, and an event content parameter.

If the location report request includes a request type parameter, the UE performs subsequent step 603; if the location report request includes an event trigger type parameter, the UE performs subsequent step 604; and if the location report request includes an event content parameter, the UE performs subsequent step 605. Description is made in FIG. 9 by using an example in which the UE performs step 603 to step 605 respectively.

603. The UE determines that a request type of the location report request is a deferred location report type according to the request type parameter.

The deferred location report type may be indicated by the request type parameter, so that the UE may determine that the request type is the deferred location report type when parsing the request type parameter.

604. The UE determines that a trigger type of the triggering event is a radio signal strength trigger type according to the event trigger type parameter.

The radio signal strength trigger type may be indicated by the event trigger type parameter, so that the UE may determine that the trigger type is the radio signal strength trigger type when parsing the event trigger type parameter, and the UE needs to acquire the radio signal strength of the UE.

605. The UE determines content information corresponding to the triggering event according to the event content parameter.

The event content corresponding to the radio signal strength-based triggering event may be indicated by the event content parameter, so that the UE may obtain the event content corresponding to the radio signal strength-based triggering event when parsing the event content parameter.

Parameters included in the event content parameter may be flexibly configured by the location application device.

In some embodiments of this disclosure, the event content parameter includes at least one of the following parameters: a radio signal strength condition, a maximum time interval of location reporting, a minimum time interval of location reporting, a location reporting frequency parameter, a QoS requirement parameter of location reporting, and an indication parameter indicating whether to report a UE location. For components of the event content parameter, reference may be made to the description in the foregoing embodiments.

606. The UE obtains a radio signal strength of the UE according to the location report request.

607. The UE determines, according to the radio signal strength of the UE, whether the triggering event occurs.

608. The UE sends event reporting information to the location application device in response to occurrence of the triggering event.

Steps 606 to 608 are similar to steps 204 to 206 in the embodiment shown in FIG. 4. Details are not described herein again.

Figure 10:
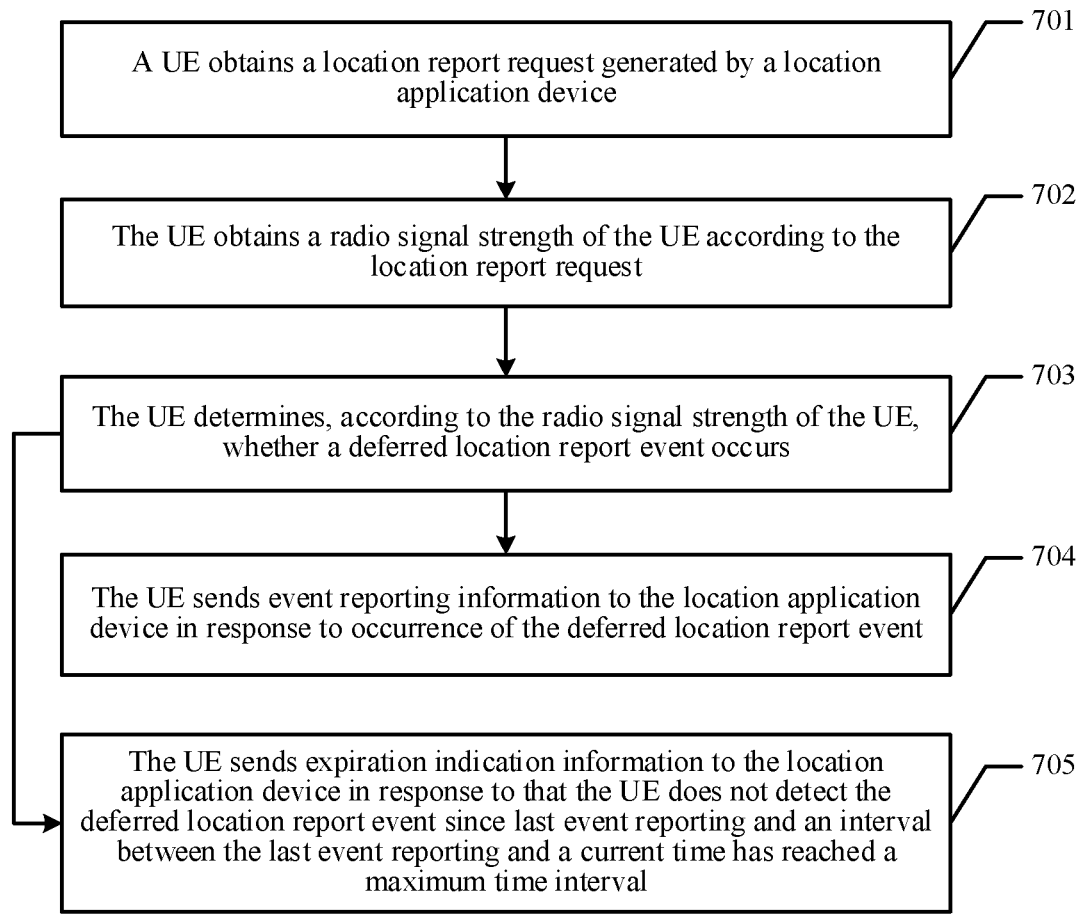
FIG. 10 is a schematic block flowchart of another exemplary event processing method performed by a UE according to an embodiment of this disclosure.

An event processing method provided in an embodiment of this disclosure is described below from the perspective of a UE. FIG. 10 shows an event processing method according to an embodiment of this disclosure, and the method mainly includes the following steps:

701. A UE obtains a location report request generated by a location application device, the location report request being used for indicating a radio signal strength-based triggering event.

702. The UE obtains a radio signal strength of the UE according to the location report request.

703. The UE determines, according to the radio signal strength of the UE, whether the triggering event occurs.

704. The UE sends event reporting information to the location application device in response to occurrence of the triggering event.

Steps 701 to 704 are similar to steps 203 to 206 in the embodiment shown in FIG. 4. Details are not described herein again.

705. The UE sends expiration indication information to the location application device in response to that the UE does not detect the triggering event since last event reporting and an interval between the last event reporting and a current time has reached a maximum time interval.

In this embodiment of this disclosure, the UE sends expiration indication information to indicate that a maximum time interval expires, in response to that an interval between last event reporting and a current time has reached the maximum time interval. For example, the UE may trigger a location reporting process to indicate that the maximum time interval expires. The maximum time interval enables the location application device to keep perceiving whether the UE continues to support a specific radio signal strength event, for example, to detect whether a radio signal reporting event is canceled due to shutdown of the UE.

For better understanding and implementation of the foregoing solutions in the embodiments of this disclosure, the following makes a description by using a corresponding application scenario as an example.

Figure 11:
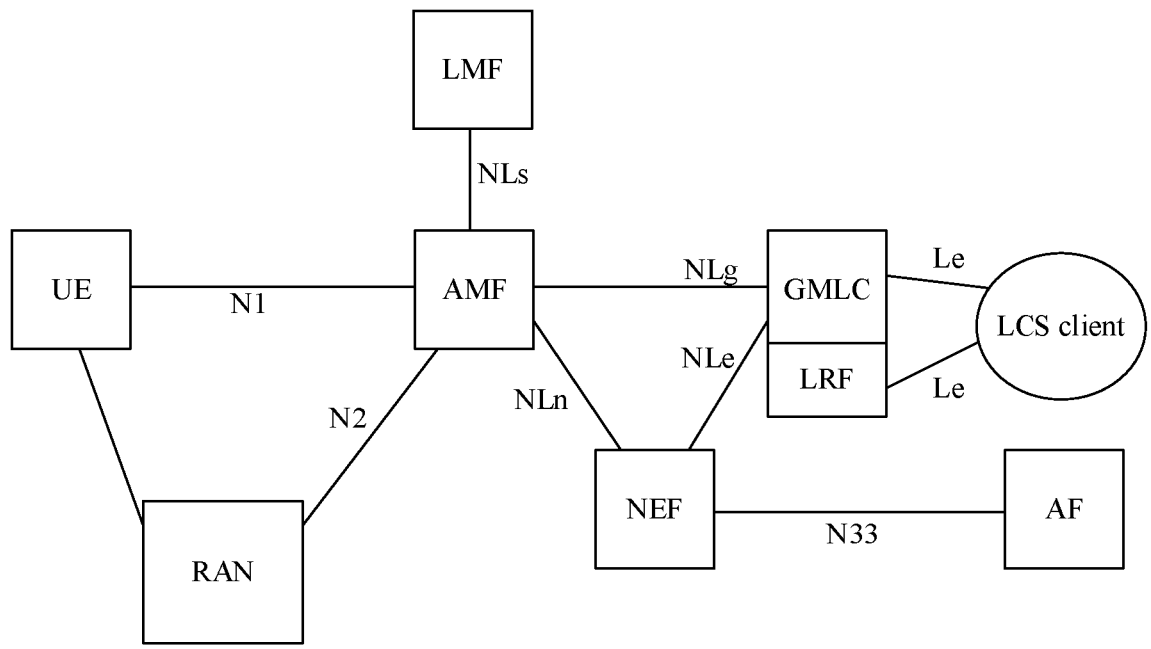
FIG. 11 is a schematic diagram of a location services-based network architecture according to an embodiment of this disclosure.

FIG. 11 is a schematic diagram of a location services-based network architecture according to an embodiment of this disclosure, and a location application device provided in this embodiment of this disclosure is an AF or an LCS client. In this system architecture, a UE communicates with a RAN by using a Uu interface, an AMF communicates with the RAN by using an N2 interface, the AMF communicates with an NEF by using an NLn interface or a service-based interface, the AMF communicates with an LMF by using an NLs interface or a service-based interface, the AMF communicates with a GMLC by using an NLg interface or a service-based interface, the NEF communicates with the GMLC by using an NLe interface or a service-based interface, the NEF communicates with the AF by using an N33 interface or a service-based interface, and the GMLC and an LRF may communicate with the LCS client by using an Le interface.

In the foregoing architecture, one AF may interact with an NEF of a 5G core network, and the AF may send a trigger event request for deferred location reporting to the NEF. The NEF sends the trigger event request to the UE. Alternatively, the LCS client sends the trigger event request for deferred location reporting to the GMLC, the GMLC sends the trigger event request to the AMF, and the AMF sends the trigger event request to the UE by using the RAN. The LCS client and the AF may set different trigger events according to respective requirements thereof.

In this embodiment of this disclosure, a location service type of the deferred location reporting (Deferred Location Request) may be set, and a triggering event triggered by a radio signal strength is defined. The UE reports location information of the UE to a third-party application server (for example, the AF) or a location server (for example, the LCS client) in response to that a radio signal strength of the UE is less than a threshold. In this embodiment of this disclosure, some application programs may adjust a policy according to the radio signal strength. For example, some video application programs may adjust a value of a buffer in response to that the radio signal strength of the UE is less than a threshold, to increase data amount of the buffer, thereby improving watching quality of a video.

In this embodiment of this disclosure, a radio signal strength-based triggering event refers to that the UE triggers a location reporting process in response to that the radio signal strength of the UE meets a radio signal strength condition (for example, being less than a radio signal strength threshold). After receiving the event reporting from the UE, the AMF indicates to the AF or the LCS client that the UE is in a weak signal coverage region, that is, a predefined event type is met. If the UE detects occurrence of the triggering event, but does not send reporting information of the triggering event in time, for example, because the UE is unable to access a network when the triggering event occurs, or a time interval between last event reporting and a current time is less than a minimum reporting interval. For example, the UE may report the event once the UE resumes its network access. For another example, once the UE detects the triggering event, if the time interval between the last event reporting and the current time is equal to or greater than the minimum reporting time interval, the UE may report the event and information of an actual occurrence time of the event right away, without a delay.

The radio signal strength-based triggering event may be controlled by the minimum and maximum reporting time intervals. The LCS client and the AF may keep perceiving, according to the maximum reporting time interval, whether the UE continues to support the specific radio signal strength-based triggering event (for example, detecting whether a radio signal reporting event is canceled due to shutdown of the UE). If the UE indicates to the LCS client and the AF that the maximum reporting time interval expires, it indicates that the radio signal strength of the UE at this moment has been higher than the preset threshold.

An indication (or an indicator) of whether to report a UE location is used for indicating whether the NEF or the GMLC needs to report location information of the UE at the occurrence of the event to the AF or the LCS client. A QoS requirement of location reporting of the UE includes a reporting precision of a UE location defined by the AF or the LCS client. For example, the reporting precision of the UE location may be in a unit of meter or in a unit of cell.

Figure 12:
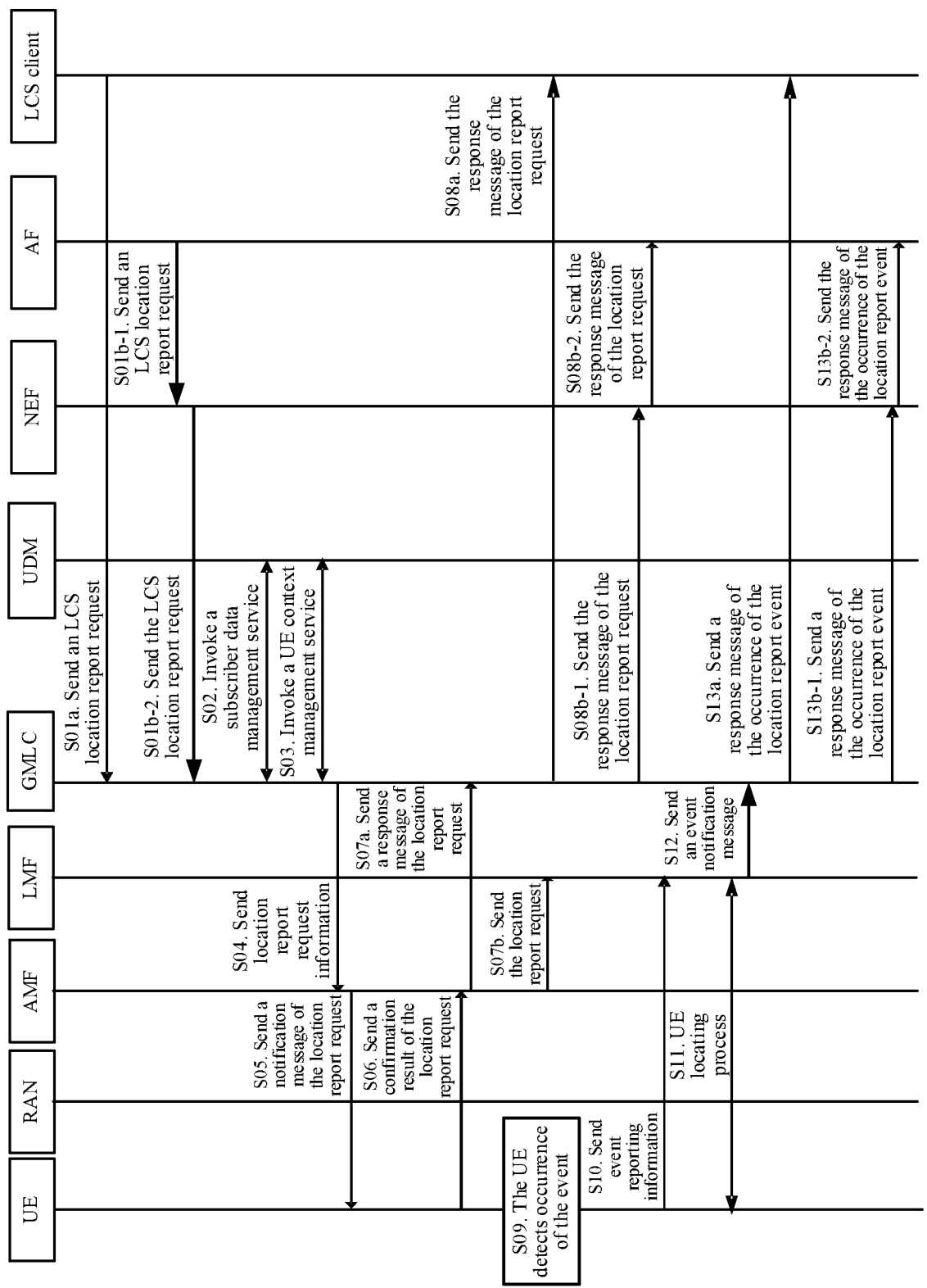
FIG. 12 is a schematic diagram of a request and trigger process of a triggering event according to an embodiment of this disclosure.

FIG. 12 is a schematic diagram of a request and trigger process of a triggering event according to an embodiment of this disclosure. FIG. 12 shows a scenario in which the UE is not roaming. An LCS client sends a location report request to a GMLC; or an AF sends an LCS location report request to an NEF, and the NEF sends the request to the GMLC. The location report request includes a deferred location report request and related parameters. In this embodiment of this disclosure, an event type of the deferred location report request and related parameters need to be carried. The event type may include a radio signal strength based or radio signal strength triggered event type. The following process is mainly included:

S01a. An LCS client sends an LCS location report request to a GMLC.

For example, the LCS client sends an LCS location report request to the GMLC. The request includes an identifier of a UE (or a UE group), a type of the location report request, namely, location deferred report (LDR), a type of a trigger event, and related parameters. The LDR refers to a location deferred report type. The trigger event (also referred to as triggering event) refers to an event which triggers the location deferred report, for example, the trigger event may include a radio signal strength being below a threshold or being within a threshold range.

S01b-1. An AF sends an LCS location report request to an NEF.

The request includes an identifier of a UE (or UE group), a type LDR of the location report request, a type of a trigger event, and related parameters. The LDR refers to a location deferred report type. The trigger event refers to a radio signal strength.

S01b-2. The NEF sends the LCS location report request to a GMLC.

The AF sends the LCS location report request to the NEF, and the NEF sends the request to the GMLC. The LCS location report request may be transmitted between the NEF and the GMLC by invoking a Ngmlc service.

Step S01a corresponds to a case where the location application device is an LCS client, and step S01b-1 and step S01b-2 correspond to a case where the location application device is an AF.

S02. The GMLC interacts with a UDM to invoke a subscriber data management (SDM) service.

A Nudm SDM service may be invoked between the GMLC and the UDM to request the UDM to verify stored privacy context information of the UE, to determine whether the location report request may be supported. If the location report request is supported, subsequent step S03 is performed; if the location report request is not supported, step S08a is performed, and a reject message of the location report request is sent to the LCS client, or, if the location report request is not supported, steps S08b-1 and S08b-2 are performed.

S03. The GMLC interacts with the UDM to invoke a UE context management (UECM) service.

The GMLC requests the UDM to obtain an address of an AMF serving the UE.

S04. The GMLC sends a location report request message to an AMF.

For example, the GMLC invokes a service of the AMF (e.g., a Namf_Location_ProvidePositioningInfo service) and sends the location report request message of the UE to the AMF, where the message includes the identifier of the UE (or UE group), an address of the GMLC, an LDR reference number, and the type and parameters of the trigger event. If the AMF does not support the deferred location report request, steps S05 and S06 are skipped, and steps S07 and S08 are directly performed. If the AMF supports the deferred location report request, step S05 is performed.

S05. The AMF sends a notification message of the location report request to the UE.

If the UE is inaccessible, the AMF waits until the UE becomes accessible; if the UE is in an idle state, the AMF initiates a network-triggered service request process, to establish a signaling connection to the UE, and a mobility management state of the UE becomes a connected state. The AMF sends the request to the UE by using a NAS message in response to that the UE is in a connected state, where the request includes the type LDR of the location report request, the type of the trigger event, and related parameters. The LDR refers to a location deferred report type. The trigger event refers to a radio signal strength.

S06. The UE sends a confirmation result of the location report request to the AMF.

If the UE supports the event type and agrees with the trigger event, the UE sends a NAS message carrying a reception acknowledgment message of the location report request to the AMF. If the UE disagrees with the trigger event, the UE sends a NAS message carrying a reject message of the location report request to the AMF. For example, the UE supports measuring radio signal strength (the event type), and agrees with the trigger event, which in this case includes the measured radio signal strength being below a threshold.

S07a. The AMF sends a response message of the location report request to the GMLC.

The AMF sends a response message of the location report request to the GMLC, where the message indicates whether the location report request is received or rejected.

S07b. If the UE receives the location report request, the AMF sends a location report request message to an LMF, where the message includes the identifier of the UE (or UE group), the type LDR of the location report request, the type of the trigger event, related parameters, and the LDR reference number.

It may be understood that there is no sequence between steps S07a and S07b.

S08a. The GMLC sends the response message of the location report request to the LCS client.

The GMLC forwards the response message of the location report request to the LCS client. The message indicates whether the location report request is received or rejected.

S08b-1. The GMLC sends the response message of the location report request to the NEF.

The GMLC forwards the response message of the location report request to the NEF. The message indicates whether the location report request is received or rejected.

S08b-2. The NEF sends the response message of the location report request to the AF.

The NEF forwards the response message of the location report request to the AF. The message indicates whether the location report request is received or rejected.

S09. The UE detects occurrence of an event.

In a possible implementation, the UE determines, according to a radio signal strength of the UE, whether a radio signal strength-based triggering event occurs.

S10. The UE sends event reporting information to the AMF and the LMF.

S11. The UE interacts with the LMF to execute a UE locating process.

S12. The LMF sends an event notification message to the GMLC.

In a possible implementation, the event notification message carries indication information of occurrence of the deferred location reporting event. If the location report request message requires the UE to report location information, the location information of the UE is carried in the event notification message.

S13a. The GMLC sends a response message of the occurrence of the location report event to the LCS client.

The LCS client obtains the event reporting information of the UE according to the received response message of the occurrence of the location report event.

S13b-1. The GMLC sends a response message of the occurrence of the location report event to the NEF.

S13b-2. The NEF sends the response message of the occurrence of the location report event to the AF.

The AF obtains the event reporting information of the UE according to the received response message of the occurrence of the location report event.

Figure 13:
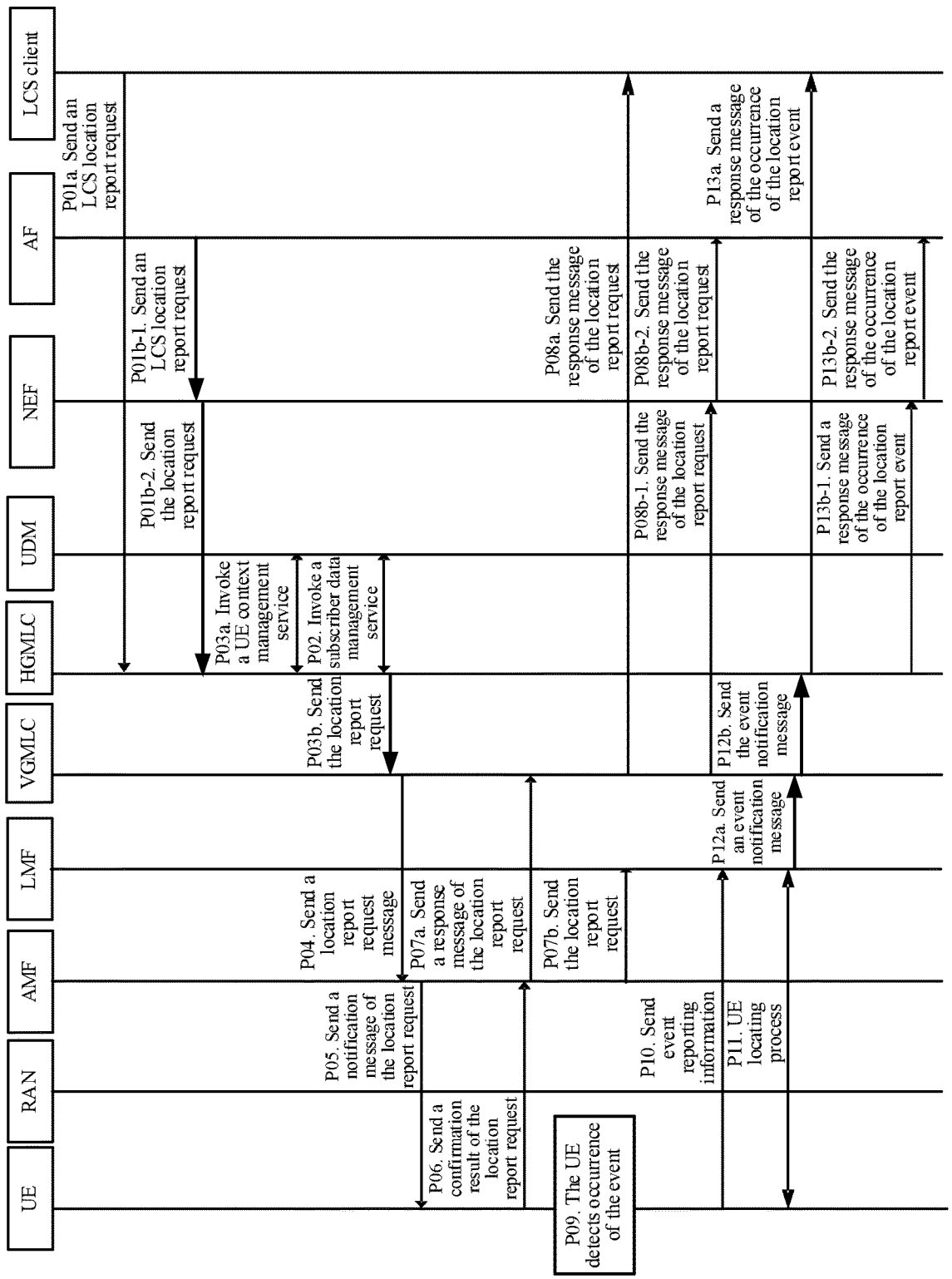
FIG. 13 is a schematic diagram of a request and trigger process of another triggering event according to an embodiment of this disclosure.

FIG. 13 is a schematic diagram of a request and trigger process of another triggering event according to an embodiment of this disclosure. FIG. 13 shows a scenario in which the UE is roaming. An LCS client sends a location report request to a home gateway mobile location center (HGMLC); or an AF sends an LCS location report request to an NEF, and the NEF sends the request to the HGMLC. The location report request includes an identifier of a UE (or UE group), a deferred location report request, and related parameters. In this embodiment of this disclosure, an event type of the deferred location report request and related parameters need to be carried. The event type is a radio signal strength. The following process is mainly included:

P01a. An LCS client sends an LCS location report request to an HGMLC.

For example, the LCS client sends an LCS location report request to the HGMLC. The request includes a type LDR of the location report request, a type of a trigger event, and related parameters. The LDR refers to a location deferred report type. The trigger event refers to a radio signal strength.

P01b-1. An AF sends an LCS location report request to an NEF.

The request includes a type LDR of the location report request, a type of a trigger event, and related parameters. The LDR refers to a location deferred report type. The trigger event refers to a radio signal strength.

P01b-2. The NEF sends the LCS location report request to an HGMLC.

The AF sends the LCS location report request to the NEF, and the NEF sends the request to the HGMLC. The LCS location report request may be transmitted between the NEF and the HGMLC by using a Ngmlc service.

Step P01a corresponds to a case where the location application device is an LCS client, and step P01b-1 and step P01b-2 correspond to a case where the location application device is an AF.

The AF sends the LCS location report request to the NEF, and the NEF sends the request to the HGMLC. The HGMLC is a GMLC in a home public land mobile network (HPLMN).

P02. The HGMLC interacts with a UDM to invoke an SDM service.

The UDM verifies stored privacy context information of the UE, to determine whether the location report request may be supported. If the location report request is supported, subsequent step P03 is performed; if the location report request is not supported, step P08a is performed, and a reject message of the location report request is sent to the LCS client, or if the location report request is not supported, steps P08b-1 and P08b-2 are performed.

P03a. The HGMLC interacts with the UDM to invoke a UECM service.

The HGMLC requests the UDM to obtain an address of a visited gateway mobile location center (VGMLC) and an address of an AMF.

P03b. The HGMLC sends the location report request to a VGMLC.

The VGMLC is a GMLC in a visited public land mobile network (VPLMN).

P04. The VGMLC sends a location report request message to an AMF.

For example, the VGMLC invokes a service of the AMF (for example, a Namf_Location_ProvidePoPitioningInfo service), and sends the location report request message to the AMF, where the message includes the identifier of the UE (or UE group), an address of the HGMLC, an LDR reference number, and the type and parameters of the trigger event. If the AMF does not support the deferred location report request, steps P05 and P06 are skipped, and step P07 is directly performed. If the AMF supports the deferred location report request, step P05 is performed.

P05. The AMF sends a notification message of the location report request to the UE.

If the UE is inaccessible, the AMF waits until the UE becomes accessible; if the UE is in an idle state, the AMF initiates a network-triggered service request process, to establish a signaling connection to the UE, and a mobility management state of the UE becomes a connected state. The AMF sends the request to the UE by using a NAS message in response to that the UE is in a connected state, where the request includes the type LDR of the location report request, the type of the trigger event, and related parameters. The LDR refers to a location deferred report type. The trigger event refers to a radio signal strength.

P06. The UE sends a confirmation result of the location report request to the AMF.

If the UE supports the event type and agrees with the trigger event, the UE sends a NAS message carrying a reception acknowledgment message of the location report request to the AMF. If the UE disagrees with the trigger event, the UE sends a NAS message carrying a reject message of the location report request to the AMF.

P07a. The AMF sends a response message of the location report request to the VGMLC.

The AMF sends a response message of the location report request to the VGMLC, where the message indicates whether the location report request is received or rejected.

P07b. If the UE receives the location report request, the AMF sends a location report request message to an LMF, where the message includes the identifier of the UE (or UE group), the type LDR of the location report request, the type of the trigger event, related parameters, and the LDR reference number.

It may be understood that there is no sequence between steps P07a and P07b.

P08a. The VGMLC sends the response message of the location report request to the LCS client.

The VGMLC forwards the response message of the location report request to the HGMLC, and the HGMLC forwards the response message to the LCS client. The message indicates whether the location report request is received or rejected.

P08b-1. The VGMLC sends the response message of the location report request to the NEF.

The VGMLC forwards the response message of the location report request to the HGMLC, and the HGMLC forwards the response message to the NEF. The message indicates whether the location report request is received or rejected.

P08b-2. The NEF sends the response message of the location report request to the AF.

The NEF forwards the response message of the location report request to the AF. The message indicates whether the location report request is received or rejected.

P09. The UE detects occurrence of an event.

In a possible implementation, the UE determines, according to a radio signal strength of the UE, whether a radio signal strength-based triggering event occurs.

P10. The UE sends event reporting information to the AMF and the LMF.

P11. The UE interacts with the LMF to execute a UE locating process.

P12a. The LMF sends an event notification message to the VGMLC.

In a possible implementation, the event notification message carries indication information of occurrence of the deferred location reporting event. If the location report request message requires the UE to report the location information, the location information of the UE is carried in the event notification message.

P12b. The VGMLC sends the event notification message to the HGMLC.

P13a. The HGMLC sends a response message of the occurrence of the location report event to the LCS client.

The LCS client obtains the event reporting information of the UE according to the received response message of the occurrence of the location report event.

P13b-1. The HGMLC sends a response message of the occurrence of the location report event to the NEF.

P13b-2. The NEF sends the response message of the occurrence of the location report event to the AF.

The AF obtains the event reporting information of the UE according to the received response message of the occurrence of the location report event.

As can be learned from the foregoing exemplary description, in the embodiments of this disclosure, an application program can obtain identifier information and location information of a UE in a region in which radio signal quality is relatively poor, which helps an application layer to adjust a parameter configuration policy of the application layer according to a network quality condition.

For ease of description, the foregoing method embodiments are stated as a combination of a series of actions. However, a person skilled in the art is to know that this application is not limited to the described action sequence, because according to this application, some steps may be performed in another sequence or simultaneously. In addition, a person skilled in the art is also to understand that the embodiments described in this specification are all exemplary embodiments, and the involved actions and modules are not necessarily required by this application.

To better implement the foregoing solutions of the embodiments of this disclosure, related apparatuses for implementing the foregoing solutions are further provided below.

Figure 14:
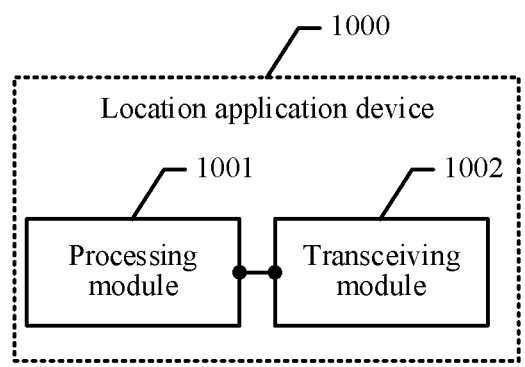
FIG. 14 is a schematic structural diagram of composition of a location application device according to an embodiment of this disclosure.

FIG. 14 shows a location application device 1000 according to an embodiment of this disclosure, including a processing module 1001 and a transceiving module 1002, where the processing module 1001 is configured to generate a location report request, the location report request being used for indicating a radio signal strength-based triggering event;

the processing module 1001 is further configured to send, by using the transceiving module 1002, the location report request to a UE, so that the UE determines, according to a radio signal strength of the UE, whether the triggering event occurs; and the processing module 1001 is further configured to obtain event reporting information that is sent by the UE to the location application device in response to occurrence of the triggering event.

In some embodiments of this disclosure, the location report request includes at least one of the following parameters: a request type parameter, an event trigger type parameter, and an event content parameter;

the request type parameter is used for indicating that a request type of the location report request is a deferred location report type;

the event trigger type parameter is used for indicating that a trigger type of the triggering event is a radio signal strength trigger type; and the event content parameter is used for indicating content information corresponding to the triggering event.

In some embodiments of this disclosure, the event content parameter includes at least one of the following parameters: a radio signal strength condition, a maximum time interval of location reporting, a minimum time interval of location reporting, a location reporting frequency parameter, a QoS requirement parameter of location reporting, and an indication parameter indicating whether to report a UE location.

In some embodiments of this disclosure, the event reporting information is sent when the UE detects occurrence of the triggering event; or the event reporting information is sent after a period of time after the UE detects occurrence of the triggering event, the event reporting information including: an actual occurrence time at which the radio signal strength of the UE meets the radio signal strength condition.

In some embodiments of this disclosure, the processing module 1001 is further configured to determine, according to the event reporting information, that the radio signal strength of the UE at the occurrence of the triggering event meets the radio signal strength condition.

In some embodiments of this disclosure, the processing module 1001 is further configured to: after sending the location report request to the UE, obtain expiration indication information sent by the UE, the expiration indication information being used for indicating that the UE does not detect the triggering event since last event reporting and an interval between the last event reporting and a current time has reached the maximum time interval; and determine, according to the expiration indication information, that the UE supports detecting the triggering event.

In some embodiments of this disclosure, when the location application device is an AF entity, the processing module 1001 is configured to send the location report request to an NEF entity; send, by using the NEF entity, the location report request to a GMLC; send, by using the GMLC, the location report request to an AMF entity; and send, by using the AMF entity, the location report request to the UE through a RAN; or when the location application device is an LCS client, the processing module 1001 is configured to send the location report request to a GMLC; send, by using the GMLC, the location report request to an AMF entity; and send, by using the AMF entity, the location report request to the UE through a RAN.

Figure 15:
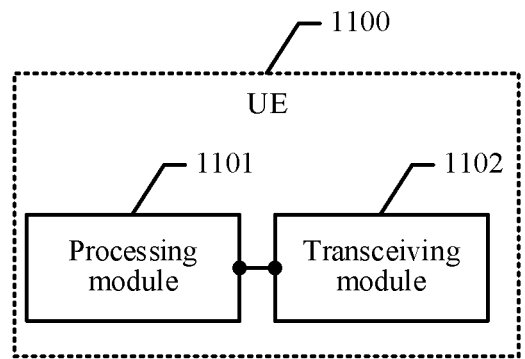
FIG. 15 is a schematic structural diagram of composition of a UE according to an embodiment of this disclosure.

FIG. 15 shows a UE 1100 according to an embodiment of this disclosure, including a processing module 1101 and a transceiving module 1102, where the processing module 1101 is configured to obtain, by using the transceiving module 1102, a location report request generated by a location application device, the location report request being used for indicating a radio signal strength-based triggering event;

the processing module 1101 is further configured to obtain a radio signal strength of the UE according to the location report request;

the processing module 1101 is further configured to determine, according to the radio signal strength of the UE, whether the triggering event occurs; and the processing module 1101 is further configured to send event reporting information to the location application device in response to occurrence of the triggering event.

In some embodiments of this disclosure, the processing module 1101 is configured to obtain, from the location report request, at least one of the following parameters: a request type parameter, an event trigger type parameter, and an event content parameter; determine that a request type of the location report request is a deferred location report type according to the request type parameter; and/or, determine that a trigger type of the triggering event is a radio signal strength trigger type according to the event trigger type parameter; and/or, determine content information corresponding to the triggering event according to the event content parameter.

In some embodiments of this disclosure, the event content parameter includes at least one of the following parameters: a radio signal strength condition, a maximum time interval of location reporting, a minimum time interval of location reporting, a location reporting frequency parameter, a QoS requirement parameter of location reporting, and an indication parameter indicating whether to report a UE location.

In some embodiments of this disclosure, the processing module 1101 is configured to detect whether the radio signal strength of the UE meets the radio signal strength condition; determine that the triggering event occurs, in response to that the radio signal strength of the UE meets the radio signal strength condition; and determine that the triggering event does not occur, in response to that the radio signal strength of the UE does not meet the radio signal strength condition.

In some embodiments of this disclosure, the processing module 1101 is further configured to send the event reporting information to the location application device in response to that the triggering event occurs and an interval between last event reporting and a current time has reached the minimum time interval; or send the event reporting information to the location application device after a period of time after detecting occurrence of the triggering event, in response to that the triggering event occurs and an interval between last event reporting and a current time has not reached the minimum time interval, the event reporting information including: an actual occurrence time at which the radio signal strength of the UE meets the radio signal strength condition; or send the event reporting information to the location application device after a period of time after detecting occurrence of the triggering event, in response to that the triggering event occurs and the UE is unable to access a network currently.

In some embodiments of this disclosure, the processing module 1101 is further configured to send expiration indication information to the location application device in response to that the UE does not detect the triggering event since last event reporting and an interval between the last event reporting and a current time has reached the maximum time interval.

As can been learned from the description of the embodiments of this disclosure, a location application device first generates a location report request, and then sends the location report request to a UE. The UE may obtain the location report request generated by the location application device. The UE obtains a radio signal strength of the UE according to the location report request, and then determines, according to the radio signal strength of the UE, whether a triggering event occurs. The UE sends event reporting information to the location application device when the triggering event occurs. The location application device obtains the event reporting information that is sent by the UE in response to the occurrence of the triggering event. In the embodiments of this disclosure, the location application device may indicate the radio signal strength-based triggering event to the UE, so that the UE may determine, according to the radio signal strength of the UE, whether the triggering event occurs. The location application device may determine a condition of the radio signal strength of the UE according to the event reporting information sent by the UE, so that the location application device can implement the requirement of an application program for adjusting a parameter configuration policy according to a radio signal strength.

Figure 16:
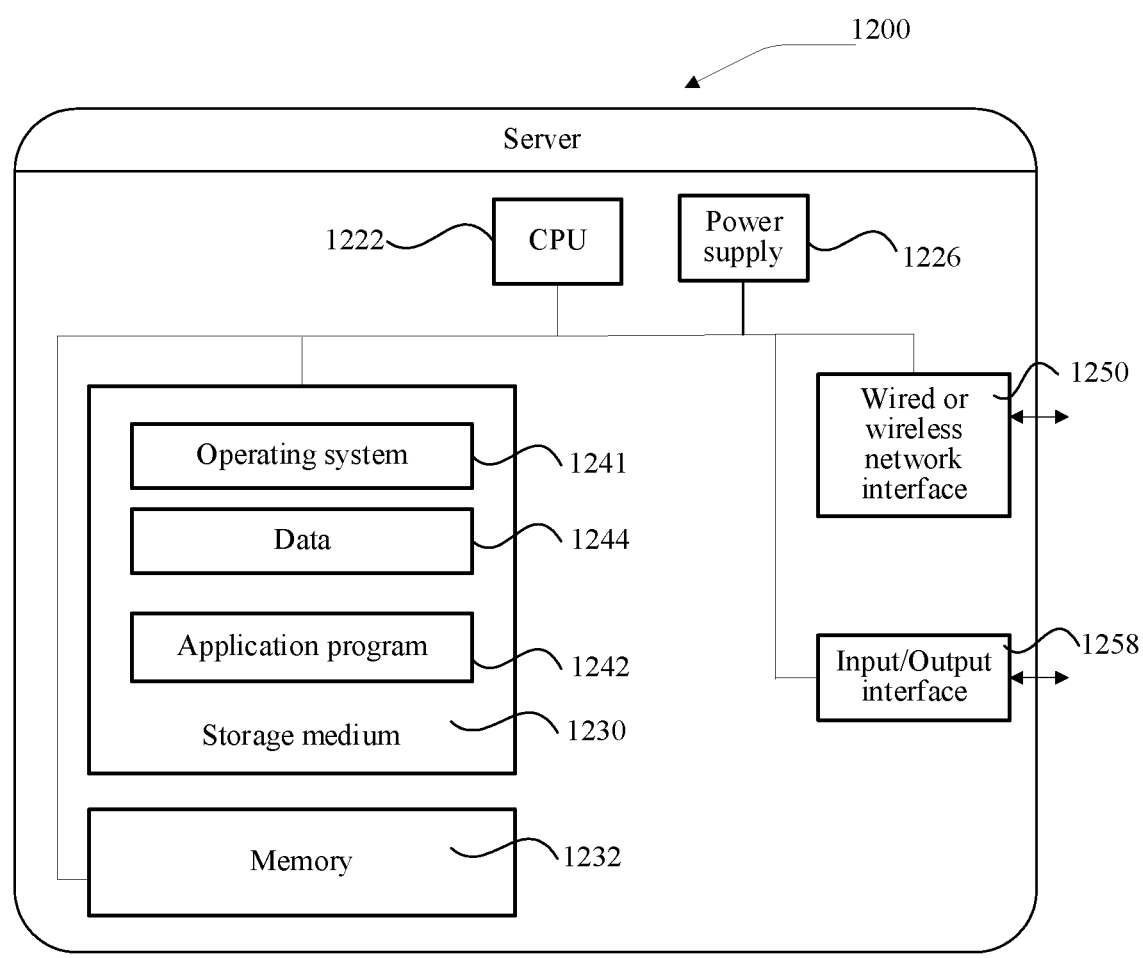
FIG. 16 is a schematic structural diagram of composition of a server to which an event processing method is applied according to an embodiment of this disclosure.

FIG. 16 is a schematic structural diagram of a server according to an embodiment of this disclosure. The server 1200 may be the location application device and may vary greatly due to different configurations or performance, and may include one or more central processing units (CPU) 1222 (for example, one or more processors) and a memory 1232, and one or more storage media 1230 (for example, one or more mass storage devices) that store an application program 1242 or data 1244. The memory 1232 and the storage medium 1230 may be transient or persistent storage. The program stored in the storage medium 1230 may include one or more modules (not shown in the figure), and each module may include a series of instruction operations on the server. Further, the CPU 1222 may be configured to communicate with the storage medium 1230 to perform the series of instruction operations in the storage medium 1230 on the server 1200.

The server 1200 may further include one or more power supplies 1226, one or more wired or wireless network interfaces 1250, one or more input/output interfaces 1258, and/or one or more operating systems 1241 such as Windows Server™, Mac OS X™, Unix™, Linux, or FreeBSD™.

The steps of the event processing method performed by the location application device in the foregoing embodiments may be based on the server structure shown in FIG. 16.

Figure 17:
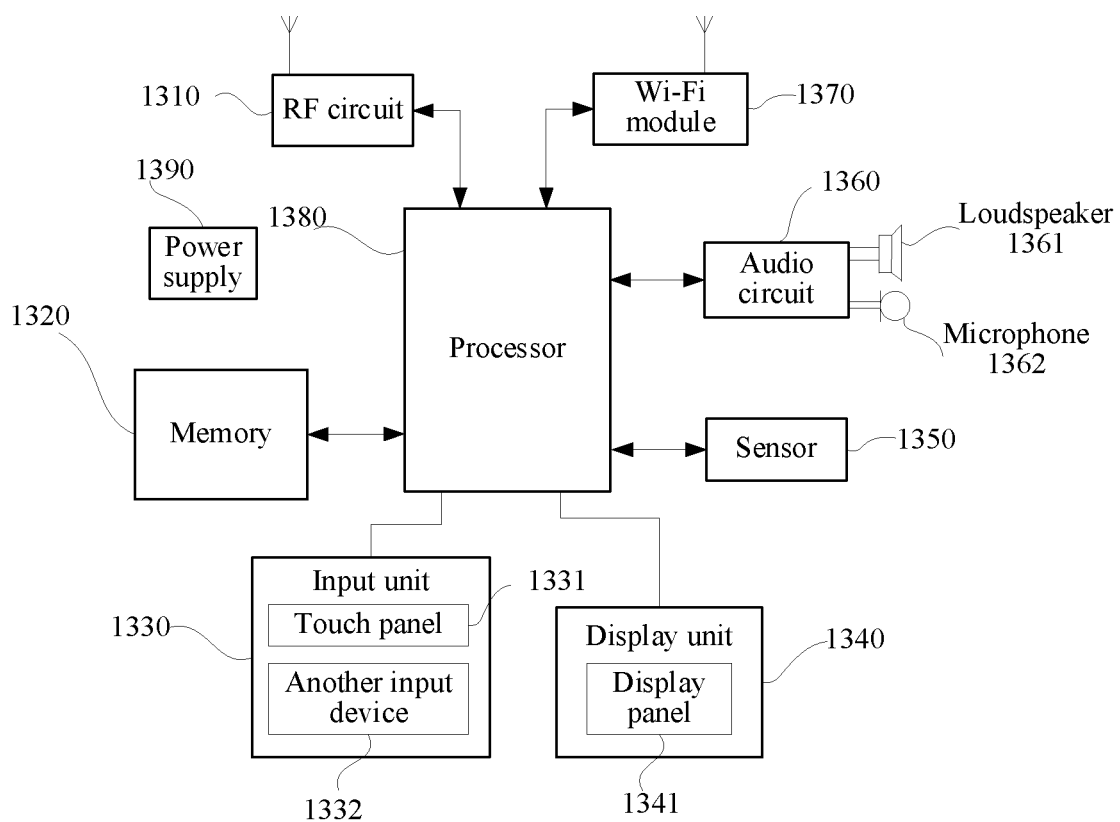
FIG. 17 is a schematic structural diagram of composition of a terminal to which an event processing method is applied according to an embodiment of this disclosure.

An embodiment of this disclosure further provides another terminal, and the terminal may be the UE. As shown in FIG. 17, for ease of description, only parts related to the embodiments of this disclosure are shown. For specific technical details that are not disclosed, refer to the method part of the embodiments of this disclosure. The terminal may be any terminal device, including a mobile phone, a tablet computer, a personal digital assistant (PDA), a point of sales (POS), and an in-vehicle computer. For example, the terminal is a mobile phone.

FIG. 17 is a block diagram of a part of a structure of a mobile phone related to a terminal according to an embodiment of this disclosure. Referring to FIG. 17, the mobile phone includes components such as a radio frequency (RF) circuit 1310, a memory 1320, an input unit 1330, a display unit 1340, a sensor 1350, an audio circuit 1360, a wireless fidelity (Wi-Fi) module 1370, a processor 1380, and a power supply 1390. A person skilled in the art may understand that the structure of the mobile phone shown in FIG. 17 does not constitute a limitation on the mobile phone, and the mobile phone may include more or fewer components than those shown in the figure, or some components may be combined, or a different component deployment may be used.

The following describes the components of the mobile phone by using an example with reference to FIG. 17.

The RF circuit 1310 may be configured to receive and send signals during an information receiving and sending process or a call process. Specifically, the RF circuit receives downlink information from a base station, then delivers the downlink information to the processor 1380 for processing, and sends designed uplink data to the base station. Generally, the RF circuit 1310 includes, but is not limited to, an antenna, at least one amplifier, a transceiver, a coupler, a low noise amplifier (LNA), and a duplexer. In addition, the RF circuit 1310 may also communicate with a network and another device through wireless communication. The wireless communication may use any communication standard or protocol, including but not limited to Global System for Mobile Communications (GSM), general packet radio service (GPRS), Code Division Multiple Access (CDMA), Wideband Code Division Multiple Access (WCDMA), Long Term Evolution (LTE), email, Short Messaging Service (SMS), and the like.

The memory 1320 may be configured to store a software program and module. The processor 1380 runs the software program and module stored in the memory 1320, to implement various functional applications and data processing of the mobile phone. The memory 1320 may mainly include a program storage area and a data storage area. The program storage area may store an operating system, an application program required by at least one function (for example, a sound playback function and an image display function), and the like. The data storage area may store data (for example, audio data and an address book) created according to the use of the mobile phone, and the like. In addition, the memory 1320 may include a high-speed random access memory, and may alternatively include a non-volatile memory, such as at least one magnetic disk storage device, a flash memory, or another volatile solid-state storage device.

The input unit 1330 may be configured to receive input digit or character information, and generate a key signal input related to the user setting and function control of the mobile phone. Specifically, the input unit 1330 may include a touch panel 1331 and another input device 1332. The touch panel 1331, which may also be referred to as a touchscreen, may collect a touch operation of a user on or near the touch panel (such as an operation of a user on or near the touch panel 1331 by using any suitable object or accessory such as a finger or a stylus), and drive a corresponding connection apparatus according to a preset program. In a possible implementation, the touch panel 1331 may include two parts: a touch detection apparatus and a touch controller. The touch detection apparatus detects a touch orientation of the user, detects a signal generated by the touch operation, and transfers the signal to the touch controller. The touch controller receives the touch information from the touch detection apparatus, converts the touch information into touch point coordinates, and sends the touch point coordinates to the processor 1380. Moreover, the touch controller may receive and execute a command sent from the processor 1380. In addition, the touch panel 1331 may be implemented by using various types, such as a resistive type, a capacitive type, an infrared type, and a surface acoustic wave type. In addition to the touch panel 1331, the input unit 1330 may further include another input device 1332. Specifically, the another input device 1332 may include, but is not limited to, one or more of a physical keyboard, a functional key (such as a volume control key or a switch key), a track ball, a mouse, and a joystick.

The display unit 1340 may be configured to display information inputted by the user or information provided for the user, and various menus of the mobile phone. The display unit 1340 may include a display panel 1341. In a possible implementation, the display panel 1341 may be configured by using a liquid crystal display (LCD), an organic light-emitting diode (OLED), or the like. Further, the touch panel 1331 may cover the display panel 1341. After detecting a touch operation on or near the touch panel, the touch panel 1331 transfers the operation to the processor 1380 to determine a touch event type. Then the processor 1380 provides corresponding visual output on the display panel 1341 according to the touch event type. Although in FIG. 17, the touch panel 1331 and the display panel 1341 are used as two separate parts to implement input and output functions of the mobile phone, in some embodiments, the touch panel 1331 and the display panel 1341 may be integrated to implement the input and output functions of the mobile phone.

The mobile phone may further include at least one sensor 1350 such as an optical sensor, a motion sensor, and other sensors. Optionally, the optical sensor may include an ambient light sensor and a proximity sensor. The ambient light sensor may adjust luminance of the display panel 1341 according to brightness of the ambient light. The proximity sensor may switch off the display panel 1341 and/or backlight when the mobile phone is moved to the ear. As one type of motion sensor, an acceleration sensor can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the mobile phone, are not further described herein.

The audio circuit 1360, a loudspeaker 1361, and a microphone 1362 may provide audio interfaces between a user and the mobile phone. The audio circuit 1360 may convert received audio data into an electrical signal and transmit the electrical signal to the loudspeaker 1361. The loudspeaker 1361 converts the electrical signal into a sound signal for output. On the other hand, the microphone 1362 converts a collected sound signal into an electrical signal. The audio circuit 1360 receives the electrical signal, converts the electrical signal into audio data, and outputs the audio data to the processor 1380 for processing. Then, the processor 1380 sends the audio data to, for example, another mobile phone by using the RF circuit 1310, or outputs the audio data to the memory 1320 for further processing.

Wi-Fi is a short distance wireless transmission technology. The mobile phone may help, by using the Wi-Fi module 1370, a user to receive and transmit an email, browse a web page, access stream media, and the like. This provides wireless broadband Internet access for the user. Although FIG. 17 shows the Wi-Fi module 1370, it may be understood that the Wi-Fi module is not a necessary component of the mobile phone, and the Wi-Fi module may be omitted as required provided that the scope of the essence of the present disclosure is not changed.

The processor 1380 is a control center of the mobile phone, and is connected to various parts of the entire mobile phone by using various interfaces and lines. By running or executing a software program and/or module stored in the memory 1320, and invoking data stored in the memory 1320, the processor 1380 executes various functions of the mobile phone and performs data processing, thereby monitoring the entire mobile phone. In a possible implementation, the processor 1380 may include one or more processing units. The processor 1380 may integrate an application processor and a modem. The application processor mainly processes an operating system, a user interface, an application, and the like. The modem mainly processes wireless communication. It may be understood that the foregoing modem may either not be integrated into the processor 1380.

The mobile phone further includes the power supply 1390 (such as a battery) for supplying power to the components. The power supply may be logically connected to the processor 1380 by using a power management system, thereby implementing functions such as charging, discharging, and power consumption management by using the power management system.

Although not shown in the figure, the mobile phone may further include a camera, a Bluetooth module, and the like. Details are not described herein again.

In an embodiment of this disclosure, the processor 1380 included in the terminal further controls and performs a procedure of an event processing method performed by the UE.

In addition, the described apparatus embodiment is merely exemplary. The units described as separate parts may or may not be physically separate, and parts displayed as units may or may not be physical units, may be located in one position, or may be distributed on multiple network units. Some or all of the modules may be selected according to actual needs to achieve the objectives of the solutions of the embodiments. In addition, in the accompanying drawings of the apparatus embodiments provided in this application, connection relationships between modules indicate that the modules have communication connections with each other, which may be implemented as one or more communication buses or signal cables. A person of ordinary skill in the art may understand and implement the embodiments without creative efforts.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

Based on the descriptions of the foregoing implementations, a person skilled in the art may clearly understand that this application may be implemented by software in addition to necessary universal hardware, or by dedicated hardware, including a dedicated integrated circuit, a dedicated CPU, a dedicated memory, a dedicated component, and the like. Generally, functions that can be performed by a computer program can be easily implemented by using corresponding hardware. Moreover, a specific hardware structure used to achieve the same function may be of various forms, for example, in a form of an analog circuit, a digital circuit, or a dedicated circuit. However, for this application, software program implementation is a better implementation in most cases. Based on such an understanding, the technical solutions of this application essentially, or the part contributing to the related art may be implemented in the form of a software product. The computer software product is stored in a readable storage medium, such as a floppy disk, a USB flash drive, a removable hard disk, a read-only memory (ROM), a random access memory (RAM), a magnetic disk, or an optical disc of a computer, and includes several instructions for instructing a computer device (which may be a personal computer, a server, a network device, or the like) to perform the methods described in the embodiments of this disclosure.

Accordingly, an embodiment of this disclosure provides a non-transitory storage medium, storing a plurality of instructions, the instructions being configured to be loaded by a processor, to perform the steps of any event processing method according to the embodiments of this disclosure.

In summary, the foregoing embodiments are merely intended for describing the technical solutions of this application, but not for limiting this application. Although this application is described in detail with reference to the foregoing embodiments, it is appreciated by persons of ordinary skill in the art that they may still make modifications to the technical solutions described in the foregoing embodiments or make equivalent replacements to some technical features thereof, without departing from the spirit and scope of the technical solutions of the embodiments of this disclosure.

What is claimed is:

1. An event processing method, performed via a radio access network (RAN) by a location application device separated from a user equipment (UE), the method comprising:
generating a location report request, the location report request being used for requesting a deferred location report based on a radio signal strength at a location of the UE and indicating a triggering event for triggering the deferred location report based on a predetermined radio signal strength condition, wherein:
the radio signal strength includes at least one of a signal coverage strength or a radio signal magnitude; and
the predetermined radio signal strength condition includes that the radio signal strength at the location of the UE is less than a predefined radio signal strength threshold, or the radio signal strength at the location of the UE is within a predefined radio signal strength range;
transmitting the location report request to the UE, the location report request triggering the UE to detect the radio signal strength at the location of the UE and indicate a triggering event occurring when the radio signal strength at the location of the UE meets the predetermined radio signal strength condition; and
obtaining event reporting information transmitted by the UE to the location application device in response to the triggering event occurring, the event reporting information including location information of the UE.

2. The method according to claim 1, wherein the location report request comprises at least one of the following parameters:
a request type parameter being used for indicating that a request type of the location report request is a deferred location report type;
an event trigger type parameter being used for indicating that a trigger type of the triggering event is a radio signal strength trigger type; or
an event content parameter being used for indicating content information corresponding to the triggering event.

3. The method according to claim 2, wherein the event content parameter comprises at least one of the following:
a radio signal strength condition;
a maximum time interval of location reporting;
a minimum time interval of location reporting;
a location reporting frequency parameter;
a Quality of Service (QoS) requirement parameter of location reporting; or
a location indication parameter indicating whether to report a UE location.

4. The method according to claim 3, wherein the event reporting information comprises an actual occurrence time at which the radio signal strength at the location of the UE meets the predetermined radio signal strength condition, and wherein:
the event reporting information is transmitted in response to the UE detecting an occurrence of the triggering event; or
the event reporting information is transmitted with a delay after the UE detects the occurrence of the triggering event.

5. The method according to claim 3, further comprising:
determining, according to the event reporting information transmitted by the UE, that the radio signal strength at the location of the UE at an occurrence of the triggering event meets the predetermined radio signal strength condition.

6. The method according to claim 3, wherein after transmitting the location report request to the UE, the method further comprises:
obtaining expiration indication information transmitted by the UE, the expiration indication information being used for indicating that the UE does not detect the triggering event since last event reporting and an interval between the last event reporting and a current time reaches the maximum time interval of location reporting; and
determining, according to the expiration indication information, that the UE supports detecting the triggering event.

7. The method according to claim 1, wherein the location application device comprises an application function (AF) entity, and wherein transmitting the location report request to the UE comprises:
transmitting the location report request to a network exposure function (NEF) entity;
transmitting, by the NEF entity, the location report request to a gateway mobile location center (GMLC);
transmitting, by the GMLC, the location report request to an access and mobility management function (AMF) entity; and
transmitting, by the AMF entity, the location report request to the UE through the RAN.

8. The method according to claim 1, wherein the location application device comprises a location services (LCS) client, and wherein transmitting the location report request to the UE comprises:
transmitting the location report request to a GMLC;
transmitting, by the GMLC, the location report request to an AMF entity; and
transmitting, by the AMF entity, the location report request to the UE through the RAN.

9. An event processing method, performed via a RAN by a UE, the method comprising:
receiving a location report request generated by a location application device separated from the UE, the location report request being used for requesting a deferred location report based on a radio signal strength at a location of the UE and indicating a triggering event for triggering the deferred location report based on a predetermined radio signal strength condition, wherein
the radio signal strength includes at least one of a signal coverage strength or a radio signal magnitude; and
the predetermined radio signal strength condition includes that the radio signal strength at the location of the UE is less than a predefined radio signal strength threshold, or the radio signal strength at the location of the UE is within a predefined radio signal strength range;

detecting the radio signal strength at the location of the UE;

determining, according to the radio signal strength at the location of the UE and the location report request, whether the triggering event occurs; and transmitting event reporting information to the location application device in response to the triggering event occurring, the event reporting information including location information of the UE.

10. The method according to claim 9, wherein after receiving the location report request generated by the location application device, the method further comprises:

obtaining, from the location report request, at least one of the following parameters: a request type parameter, an event trigger type parameter, or an event content parameter;

determining that a request type of the location report request is a deferred location report type according to the request type parameter;

determining that a trigger type of the triggering event is a radio signal strength trigger type according to the event trigger type parameter; and determining content information corresponding to the triggering event according to the event content parameter.

11. The method according to claim 10, wherein the event content parameter comprises at least one of the following:

a radio signal strength condition;

a maximum time interval of location reporting;

a minimum time interval of location reporting;

a location reporting frequency parameter;

a Quality of Service (QoS) requirement parameter of location reporting; and a location indication parameter indicating whether to report a UE location.

12. The method according to claim 11, wherein determining, according to the radio signal strength at the location of the UE and the location report request, whether the triggering event occurs comprises:

detecting the radio signal strength at the location of the UE;

determining that the triggering event occurs in response to the radio signal strength at the location of the UE meeting the predetermined radio signal strength condition; or determining that the triggering event does not occur in response to the radio signal strength at the location of the UE not meeting the predetermined radio signal strength condition.

13. The method according to claim 11, wherein the transmitting event reporting information to the location application device in response to the triggering event occurring comprises one of:

transmitting event reporting information to the location application device in response to the triggering event occurring and a time interval between last event reporting and a current time reaching the minimum time interval of location reporting;

transmitting event reporting information to the location application device with a delay after detecting an occurrence of the triggering event, in response to the occurrence of the triggering event and a time interval between last event reporting and a current time not reaching the minimum time interval, the event reporting information comprising an actual occurrence time at which the radio signal strength of the UE meets the radio signal strength condition; or transmitting event reporting information to the location application device with a delay after detecting the occurrence of the triggering event, in response to the occurrence of the triggering event and the UE being unable to access a network when the triggering event occurs.

14. The method according to claim 11, wherein after determining, according to the radio signal strength at the location of the UE, whether the triggering event occurs, the method further comprises:

transmitting expiration indication information to the location application device in response to the UE not detecting the triggering event since last event reporting and a time interval between the last event reporting and a current time reaching the maximum time interval of location reporting.

15. A device for event processing, comprising a memory for storing computer instructions and a processor in communication with the memory, wherein, when the processor executes the computer instructions, the processor is configured to cause the device to:

generate a location report request, the location report request being used for requesting a deferred location report based on a radio signal strength at a location of a user equipment (UE) and indicating a triggering event for triggering the deferred location report based on a predetermined radio signal strength condition, wherein the radio signal strength includes at least one of a signal coverage strength or a radio signal magnitude; and the predetermined radio signal strength condition includes that the radio signal strength at the location of the UE is less than a predefined radio signal strength threshold, or the radio signal strength at the location of the UE is within a predefined radio signal strength range;

transmit the location report request to the UE, the location report request triggering the UE to detect the radio signal strength at the location of the UE and indicate a triggering event occurring when the radio signal strength at the location of the UE meets the predetermined radio signal strength condition; and obtain event reporting information transmitted by the UE to the device in response to the triggering event occurring, the event reporting information including location information of the UE.

16. The device according to claim 15, wherein the location report request comprises at least one of the following parameters:

a request type parameter being used for indicating that a request type of the location report request is a deferred location report type;

an event trigger type parameter being used for indicating that a trigger type of the triggering event is a radio signal strength trigger type; or an event content parameter being used for indicating content information corresponding to the triggering event.

17. The device according to claim 16, wherein the event content parameter comprises at least one of the following:

a radio signal strength condition;

a maximum time interval of location reporting;

a minimum time interval of location reporting;

a location reporting frequency parameter;

a Quality of Service (QoS) requirement parameter of location reporting; or a location indication parameter indicating whether to report a UE location.

18. The device according to claim 17, wherein the event reporting information comprises an actual occurrence time at which the radio signal strength at the location of the UE meets the predetermined radio signal strength condition, and wherein:

the event reporting information is transmitted in response to the UE detecting an occurrence of the triggering event; or the event reporting information is transmitted with a delay after the UE detects the occurrence of the triggering event.

19. The device according to claim 17, wherein, when the processor executes the computer instructions, the processor is configured to further cause the device to:

determine, according to the event reporting information transmitted by the UE, that the radio signal strength at the location of the UE at an occurrence of the triggering event meets the predetermined radio signal strength condition.

20. The device according to claim 17, wherein, after the processor is configured to cause the device to transmit the location report request to the UE, the processor is configured to further cause the device to:

obtain expiration indication information transmitted by the UE, the expiration indication information being used for indicating that the UE does not detect the triggering event since last event reporting and an interval between the last event reporting and a current time reaches the maximum time interval of location reporting; and determine, according to the expiration indication information, that the UE supports detecting the triggering event.

\* \* \* \* \*